United States Patent
Mohamed Kasim

(10) Patent No.: US 12,256,255 B2
(45) Date of Patent: Mar. 18, 2025

(54) ROAMING CANDIDATE SELECTION WITH OVERLAPPING BASIC SERVICE SET (OBSS) DETECTION

(71) Applicant: QUALCOMM Incorporated, San Diego, CA (US)

(72) Inventor: Abu Dahir Mohamed Kasim, Coimbatore (IN)

(73) Assignee: QUALCOMM Incorporated, San Diego, CA (US)

( * ) Notice: Subject to any disclaimer, the term of this patent is extended or adjusted under 35 U.S.C. 154(b) by 271 days.

(21) Appl. No.: 17/477,728

(22) Filed: Sep. 17, 2021

(65) Prior Publication Data

US 2023/0105571 A1  Apr. 6, 2023

(51) Int. Cl.
*H04W 24/10* (2009.01)
*H04B 17/318* (2015.01)
*H04W 8/12* (2009.01)
*H04W 84/12* (2009.01)

(52) U.S. Cl.
CPC .......... *H04W 24/10* (2013.01); *H04B 17/318* (2015.01); *H04W 8/12* (2013.01); *H04W 84/12* (2013.01)

(58) Field of Classification Search
CPC .................................................... H04W 24/10
See application file for complete search history.

(56) References Cited

U.S. PATENT DOCUMENTS

| | | | |
|---|---|---|---|
| 11,019,515 B1 * | 5/2021 | Sun | H04W 24/08 |
| 2014/0112175 A1 * | 4/2014 | Pantelidou | H04W 28/26 |
| | | | 370/252 |
| 2016/0007386 A1 * | 1/2016 | Park | H04W 76/10 |
| | | | 370/329 |
| 2020/0413445 A1 | 12/2020 | Seok et al. | |

(Continued)

FOREIGN PATENT DOCUMENTS

EP    3562214 A1    10/2019

OTHER PUBLICATIONS

International Search Report and Written Opinion—PCT/US2022/074733—ISA/EPO—Nov. 25, 2022.

(Continued)

*Primary Examiner* — Jason E Mattis
(74) *Attorney, Agent, or Firm* — Arun Swain

(57) ABSTRACT

This disclosure provides methods, devices and systems for wireless roaming. Some implementations more specifically relate to roaming candidate selection based on overlapping basic service set (OBSS) detection. In some aspects, a wireless station (STA) may identify one or more OBSSs based on wireless communications detected during an OBSS detection period and may roam to a new access point (AP) based on the identified OBSSs when a roaming condition is satisfied. In some implementations, the STA may store information associated with each identified OBSS in an OBSS table. When the roaming condition is satisfied, the STA may listen for beacon or probe response frames from other APs operating on its current wireless channel. If the STA receives beacon or probe response frames from one or (Continued)

more APs that match the OBSS table, the STA may roam to the matching AP with the highest candidate score.

20 Claims, 14 Drawing Sheets

(56) References Cited

U.S. PATENT DOCUMENTS

2021/0185597 A1\* 6/2021 Chitrakar .......... H04W 52/0241
2021/0235375 A1\* 7/2021 Desai ................ H04W 28/0268

OTHER PUBLICATIONS

Jantaweetip A., et al., "Bandwidth Management for Hybrid Association Control Schemes and Load Balancing in WLANs", Electrical Engineering/Electronics, Computer, Telecommunications and Information Technology, 2009, ECTI-CON 2009, 6th International Conference on, IEEE, Piscataway, NJ, USA, May 6, 2009, pp. 1000-1003, XP031481155, ISBN:978-1-4244-3387-2, Paragraph [000I].
Lei T., et al., "Handoff Management Scheme Based on Frame Loss Rate and RSSI Prediction for IEEE 802.11 Networks", 2016 International Symposium on Wireless Communication Systems (ISWCS), IEEE, Sep. 20, 2016, pp. 555-559, XP032981825, DOI:10.1109/ISWCS.2016.7600966, Paragraph [000I], [0III].
Qureshi K.I., et al., "A Review on Design and Implementation of Software-Defined WLANs", IEEE Systems Journal, IEEE, US, vol. 14, No. 2, Jun. 1, 2020, pp. 2601-2614, XP011791010, ISSN:1932-8184, DOI: 10.1109/JSYST.2019.2960400, Paragraph [III.B].

\* cited by examiner

ROAMING CANDIDATE SELECTION WITH OVERLAPPING BASIC SERVICE SET (OBSS) DETECTION

TECHNICAL FIELD

This disclosure relates generally to wireless communication, and more specifically to roaming candidate selection with overlapping basic service set (OBSS) detection.

DESCRIPTION OF THE RELATED TECHNOLOGY

A wireless local area network (WLAN) may be formed by one or more access points (APs) that provide a shared wireless communication medium for use by a number of client devices also referred to as stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

As a STA moves through a given environment, the quality of communications with an associated AP may fluctuate. For example, the perceived signal quality of the WLAN may degrade as the STA moves further away from the associated AP. The IEEE 802.11 standard defines a roaming procedure that allows a STA to associate with a new AP when certain conditions are satisfied (such as when the received signal strength indication (RSSI) of wireless communications with its associated AP falls below a threshold level). A STA may initiate a roaming procedure by scanning for a new AP to associate with while the STA is still associated with the current AP. For example, the STA may scan all available wireless channels for other APs in the vicinity (also referred to as "roaming candidates") that may provide higher quality or throughput of communications than the current associated AP.

A STA may scan for roaming candidates by broadcasting probe requests or listening for beacons on each available channel. In other words, the STA must "dwell" on multiple wireless channels to listen for management frames from other APs. The STA must also pause or suspend communications on its current wireless channel when dwelling on a different wireless channel. After scanning all available channels, the STA may compare the capabilities or features of the roaming candidates to select a target AP to roam to (such as the AP with the highest RSSI or supported capabilities). If the target AP operates on a new wireless channel, the STA must additionally wait for a channel grant before it can resume communications on the new wireless channel. As such, scanning operations may significantly affect the throughput or latency of communications by the STA.

SUMMARY

The systems, methods and devices of this disclosure each have several innovative aspects, no single one of which is solely responsible for the desirable attributes disclosed herein.

One innovative aspect of the subject matter described in this disclosure can be implemented as a method of wireless communication. The method may be performed by a wireless communication device, and may include detecting, on a wireless channel, wireless communications associated with one or more overlapping basic service sets (OBSSs); performing a signal quality measurement operation that indicates a quality of wireless communications with an associated access point (AP) on the wireless channel, where the signal quality measurement operation indicates, at a first time, that the quality of wireless communications with the associated AP is below a threshold signal quality; and selectively roaming, at the first time, to a new AP based on the wireless communications associated with the one or more OBSSs detected prior to the first time.

In some implementations, the method may further include storing a set of BSS identifiers (BSSIDs) associated with the one or more OBSSs. In some implementations, the method may further include storing a respective candidate score associated with each BSSID in the set of BSSIDs, where each of the candidate scores indicates a suitability of a respective OBSS of the one or more OBSSs as a roaming candidate for the wireless communication device. In some implementations, the method may further include storing wireless signal information associated with each BSSID in the set of BSSIDs, where the wireless signal information associated with each BSSID indicates one or more characteristics associated with a respective wireless communication of the detected wireless communications. In some implementations, the one or more characteristics may include at least one of a received signal strength indication (RSSI), a timestamp, or a bandwidth. In some implementations, the method may further include storing BSS information associated with each BSSID in the set of BSSIDs, where the BSS information associated with each BSSID indicates one or more capabilities supported by a respective OBSS of the one or more OBSSs.

In some implementations, the selective roaming to the new AP may include receiving, from the new AP, a management frame having an address field that matches a BSSID in the set of BSSIDs; and roaming to the new AP based on receiving the management frame. In some other implementations, the method may further include broadcasting, on the wireless channel, a probe request frame that fails to elicit a probe response frame having an address field that matches a BSSID in the set of BSSIDs; and listening for management frames on one or more additional wireless channels based on the probe request frame failing to elicit a probe response frame having an address field that matches a BSSID in the set of BSSIDs. In some implementations, the selective roaming to the new AP may include receiving a probe response frame from the new AP responsive to the probe request frame broadcast on the wireless channel, where the new AP is different than the one or more OBSSs; and roaming to the new AP based on receiving the probe response frame. In some other implementations, the selective roaming to the new AP may include receiving a management frame from the new AP on one of the one or more additional wireless channels; and roaming to the new AP based on receiving the management frame.

Another innovative aspect of the subject matter described in this disclosure can be implemented in a wireless communication device. In some implementations, the wireless communication device may include at least one processor and at least one memory communicatively coupled with the at least one processor and storing processor-readable code. In some implementations, execution of the processor-readable code by the at least one processor causes the wireless communication device to perform operations including detecting, on a wireless channel, wireless communications associated with one or more OBSSs; performing a signal quality measurement operation that indicates a quality of wireless communications with an associated AP on the wireless channel, where the signal quality measurement operation indicates, at a first time, that the quality of wireless communications with the associated AP is below a threshold signal quality; and selectively roaming, at the first time, to a new AP based on the wireless communications associated with the one or more OBSSs detected prior to the first time.

BRIEF DESCRIPTION OF THE DRAWINGS

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

Like reference numbers and designations in the various drawings indicate like elements.

DETAILED DESCRIPTION

Figure 1:
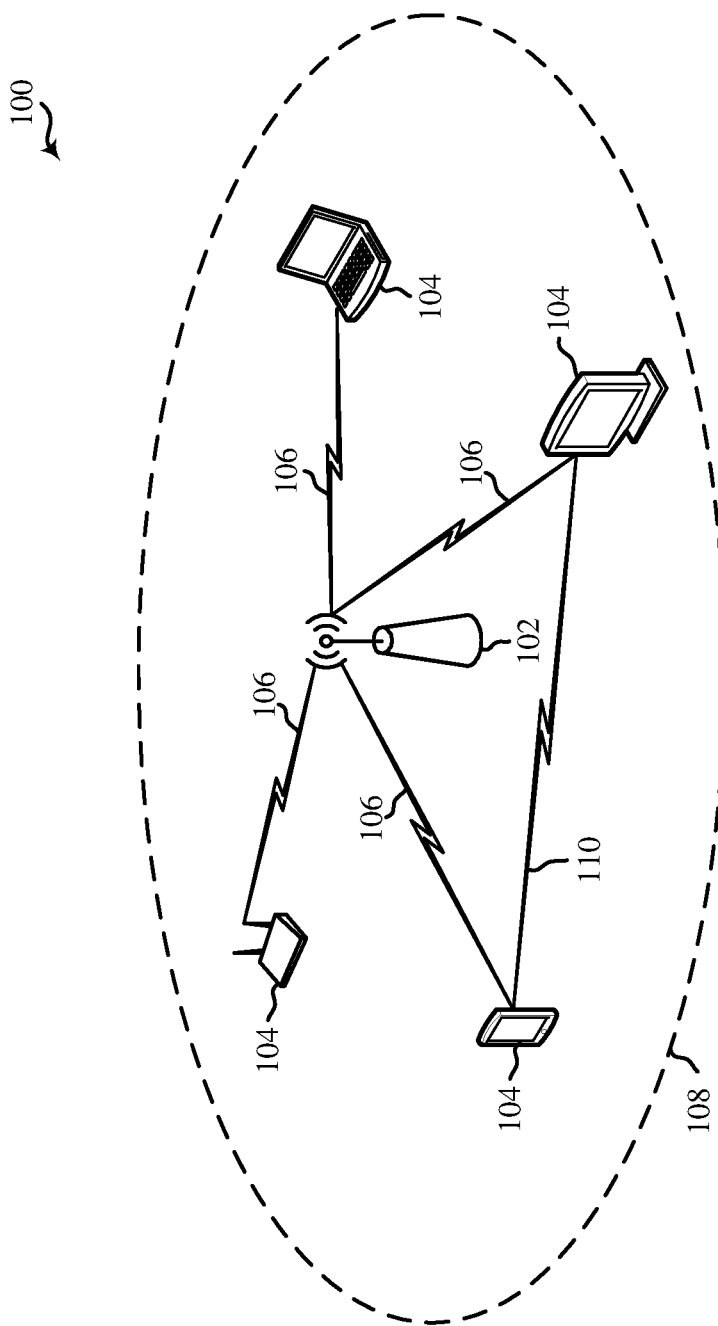
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IoT) network.

Aspects of the present disclosure recognize that overlapping basic service sets (OBSSs) exist in many wireless communication environments (particularly in dense or crowded environments). An OBSS is any basic service set (BSS) having an overlapping coverage area, and operating on the same wireless channel, as another BSS. The IEEE 802.11ax amendment, and later generations, of the IEEE 802.11 standard supports concurrent packet transmissions in two or more OBSSs through BSS coloring and spatial reuse. More specifically, spatial reuse may be permitted among OBSSs that are associated with different BSS colors. A "BSS color collision" occurs when two or more OBSSs are associated with the same BSS color. A wireless station (STA) that support the IEEE 802.11ax amendment may listen to wireless communications from OBSSs to detect and report BSS color collisions to its associated access point (AP). As used herein, the term "OBSS detection period" refers to the time at which the STA listens to such wireless communications from OBSSs.

Various aspects relate generally to wireless roaming, and more particularly, to roaming candidate selection based on OBSS detection. For example, a STA may periodically listen for wireless communications from OBSSs (during an OBSS detection period) as part of a BSS color collision reporting procedure. In some aspects, the STA may identify one or more OBSSs based on wireless communications detected during one or more OBSS detection periods and may roam to a new AP based on the previously identified OBSSs when a roaming condition is satisfied (such as when the signal quality of wireless communications with its associated AP falls below a threshold level). More specifically, any OBSS (or AP) identified during the OBSS detection periods may be a potential roaming candidate for the STA. In some implementations, the STA may store information associated with each identified OBSS in an OBSS table. Such information may include, for example, a BSS identifier (BSSID) and a candidate score indicating a suitability of the OBSS as a roaming candidate for the STA. When the roaming condition is satisfied, the STA may listen for packets (such as beacon or probe response frames) from other APs operating on its current wireless channel. If the STA detects a packet from one or more APs that match the OBSS table, the STA may roam to the matching AP with the highest candidate score.

Particular implementations of the subject matter described in this disclosure can be implemented to realize one or more of the following potential advantages. By identifying roaming candidates based on wireless communications detected during OBSS detection periods, aspects of the present disclosure may leverage existing STA functionality to improve the speed and efficiency of wireless roaming. For example, STAs operating in accordance with the IEEE 802.11ax amendment, and later generations, of the IEEE 802.11 standard may periodically listen for wireless communications from OBSSs as part of a BSS color collision reporting procedure. By storing a record of each AP identified during an OBSS detection period, a STA may assess the suitability of each AP as a roaming candidate even before a roaming condition is satisfied. Thus, when the roaming condition is satisfied, the STA can quickly select a suitable AP to roam to without scanning all available wireless channels. More specifically, the STA may roam to a new AP without leaving its current wireless channel. As such, the STA does not need to suspend communications with its associated AP or wait for a channel grant to resume communications with the new AP.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ah, 802.11ad, 802.11ay, 802.11ax, 802.11az, 802.11ba and 802.11be). The WLAN 100 may include numerous wireless communication devices such as an access point (AP) 102 and multiple stations (STAs) 104. While only one AP 102 is shown, the WLAN network 100 also can include multiple APs 102.

Each of the STAs 104 also may be referred to as a mobile station (MS), a mobile device, a mobile handset, a wireless handset, an access terminal (AT), a user equipment (UE), a subscriber station (SS), or a subscriber unit, among other possibilities. The STAs 104 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), among other possibilities.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified to users by a service set identifier (SSID), as well as to other devices by a basic service set identifier (BSSID), which may be a medium access control (MAC) address of the AP 102. The AP 102 periodically broadcasts beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHZ, 5 GHZ, 6 GHZ or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may be configured to identify or select an AP 102 with which to associate based on the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may be configured to periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some cases, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some cases, ad hoc networks may be implemented within a larger wireless network such as the WLAN 100. In such implementations, while the STAs 104 may be capable of communicating with each other through the AP 102 using communication links 106, STAs 104 also can communicate directly with each other via direct wireless links 110. Additionally, two STAs 104 may communicate via a direct communication link 110 regardless of whether both STAs 104 are associated with and served by the same AP 102. In such an ad hoc system, one or more of the STAs 104 may assume the role filled by the AP 102 in a BSS. Such a STA 104 may be referred to as a group owner (GO) and may coordinate transmissions within the ad hoc network. Examples of direct wireless links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to the IEEE 802.11 family of wireless communication protocol standards (such as that defined by the IEEE 802.11-2016 specification or amendments thereof including, but not limited to, 802.11ah, 802.11ad, 802.11ay, 802.11ax, 802.11az, 802.11ba and 802.11be). These standards define the WLAN radio and baseband protocols for the PHY and medium access control (MAC) layers. The APs 102 and STAs 104 transmit and receive wireless communications (hereinafter also referred to as "Wi-Fi communications") to and from one another in the form of physical layer convergence protocol (PLCP) protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHZ band, the 5 GHz band, the 60 GHz band, the 3.6 GHZ band, and the 700 MHz band. Some implementations of the APs 102 and STAs 104 described herein also may communicate in other frequency bands, such as the 6 GHz band, which may support both licensed and unlicensed communications. The APs 102 and STAs 104 also can be configured to communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHZ, 80 MHZ, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is based on the particular IEEE 802.11 protocol to be used to transmit the payload.

Figure 2A:
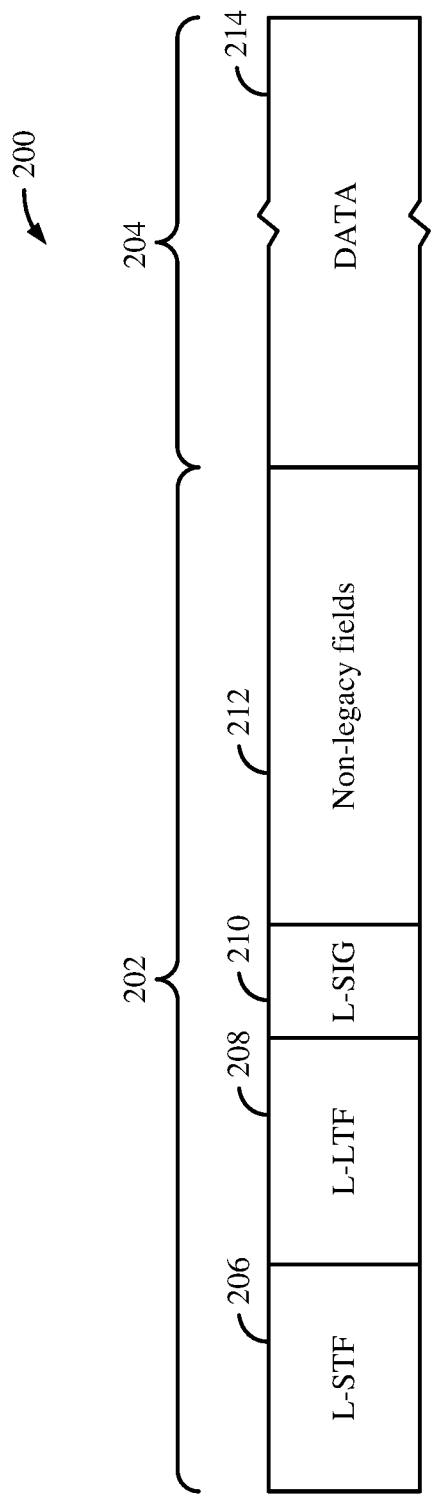
FIG. 2A shows an example protocol data unit (PDU) usable for communications between an access point (AP) and one or more wireless stations (STAs).

FIG. 2A shows an example protocol data unit (PDU) 200 usable for wireless communication between an AP 102 and one or more STAs 104. For example, the PDU 200 can be configured as a PPDU. As shown, the PDU 200 includes a PHY preamble 202 and a PHY payload 204. For example, the preamble 202 may include a legacy portion that itself includes a legacy short training field (L-STF) 206, which may consist of two BPSK symbols, a legacy long training field (L-LTF) 208, which may consist of two BPSK symbols, and a legacy signal field (L-SIG) 210, which may consist of two BPSK symbols. The legacy portion of the preamble 202 may be configured according to the IEEE 802.11a wireless communication protocol standard. The preamble 202 may also include a non-legacy portion including one or more non-legacy fields 212, for example, conforming to an IEEE wireless communication protocol such as the IEEE 802.11ac, 802.11ax, 802.11be or later wireless communication protocol protocols.

The L-STF 206 generally enables a receiving device to perform automatic gain control (AGC) and coarse timing and frequency estimation. The L-LTF 208 generally enables a receiving device to perform fine timing and frequency estimation and also to perform an initial estimate of the wireless channel. The L-SIG 210 generally enables a receiving device to determine a duration of the PDU and to use the determined duration to avoid transmitting on top of the PDU. For example, the L-STF 206, the L-LTF 208 and the L-SIG 210 may be modulated according to a binary phase shift keying (BPSK) modulation scheme. The payload 204 may be modulated according to a BPSK modulation scheme, a quadrature BPSK (Q-BPSK) modulation scheme, a quadrature amplitude modulation (QAM) modulation scheme, or another appropriate modulation scheme. The payload 204 may include a PSDU including a data field (DATA) 214 that, in turn, may carry higher layer data, for example, in the form of medium access control (MAC) protocol data units (MPDUs) or an aggregated MPDU (A-MPDU).

Figure 2B:
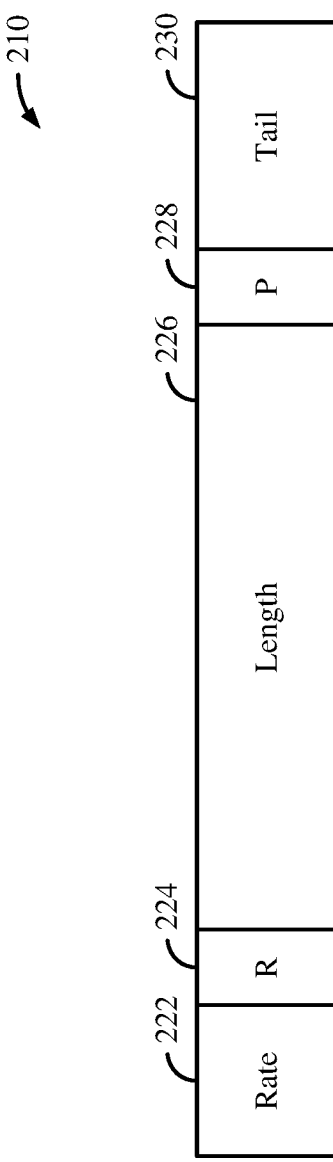
FIG. 2B shows an example field in the PDU of FIG. 2A.

FIG. 2B shows an example L-SIG 210 in the PDU 200 of FIG. 2A. The L-SIG 210 includes a data rate field 222, a reserved bit 224, a length field 226, a parity bit 228, and a tail field 230. The data rate field 222 indicates a data rate (note that the data rate indicated in the data rate field 212 may not be the actual data rate of the data carried in the payload 204). The length field 226 indicates a length of the packet in units of, for example, symbols or bytes. The parity bit 228 may be used to detect bit errors. The tail field 230 includes tail bits that may be used by the receiving device to terminate operation of a decoder (for example, a Viterbi decoder). The receiving device may utilize the data rate and the length indicated in the data rate field 222 and the length field 226 to determine a duration of the packet in units of, for example, microseconds (µs) or other time units.

Figure 3:
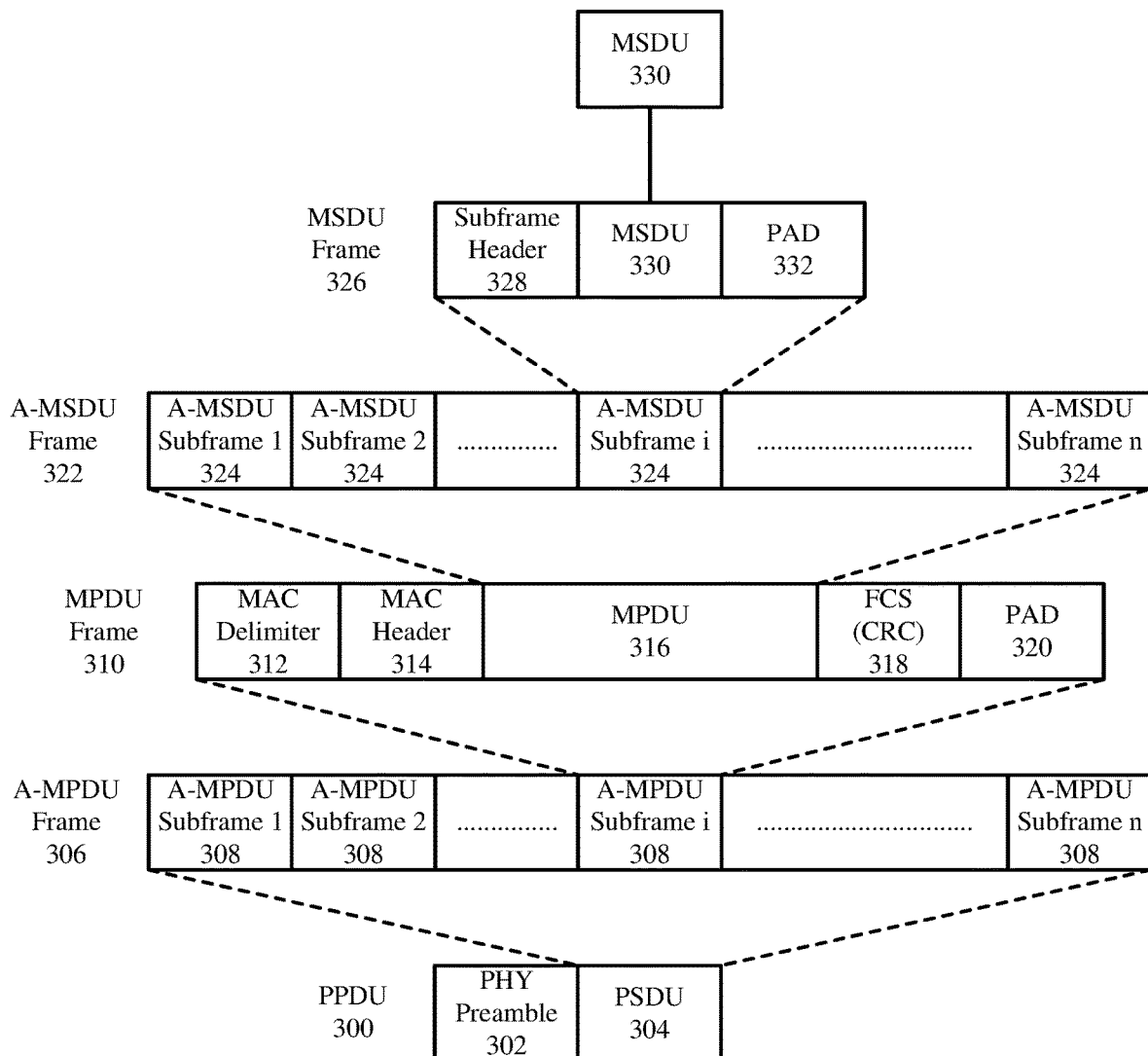
FIG. 3 shows an example physical layer convergence protocol (PLCP) protocol data unit (PPDU) usable for communications between an AP and one or more STAs.

FIG. 3 shows an example PPDU 300 usable for communications between an AP 102 and one or more STAs 104. As described above, each PPDU 300 includes a PHY preamble 302 and a PSDU 304. Each PSDU 304 may represent (or "carry") one or more MAC protocol data units (MPDUs) 316. For example, each PSDU 304 may carry an aggregated MPDU (A-MPDU) 306 that includes an aggregation of multiple A-MPDU subframes 308. Each A-MPDU subframe 306 may include an MPDU frame 310 that includes a MAC delimiter 312 and a MAC header 314 prior to the accompanying MPDU 316, which comprises the data portion ("payload" or "frame body") of the MPDU frame 310. Each MPDU frame 310 may also include a frame check sequence (FCS) field 318 for error detection (for example, the FCS field may include a cyclic redundancy check (CRC)) and padding bits 320. The MPDU 316 may carry one or more MAC service data units (MSDUs) 326. For example, the MPDU 316 may carry an aggregated MSDU (A-MSDU) 322 including multiple A-MSDU subframes 324. Each A-MSDU subframe 324 contains a corresponding MSDU 330 preceded by a subframe header 328 and in some cases followed by padding bits 332.

Referring back to the MPDU frame 310, the MAC delimiter 312 may serve as a marker of the start of the associated MPDU 316 and indicate the length of the associated MPDU 316. The MAC header 314 may include multiple fields containing information that defines or indicates characteristics or attributes of data encapsulated within the frame body 316. The MAC header 314 includes a duration field indicating a duration extending from the end of the PPDU until at least the end of an acknowledgment (ACK) or Block ACK (BA) of the PPDU that is to be transmitted by the receiving wireless communication device. The use of the duration field serves to reserve the wireless medium for the indicated duration, and enables the receiving device to establish its network allocation vector (NAV). The MAC header 314 also includes one or more fields indicating addresses for the data encapsulated within the frame body 316. For example, the MAC header 314 may include a combination of a source address, a transmitter address, a receiver address or a destination address. The MAC header 314 may further include a frame control field containing control information. The frame control field may specify a frame type, for example, a data frame, a control frame, or a management frame.

Figure 4:
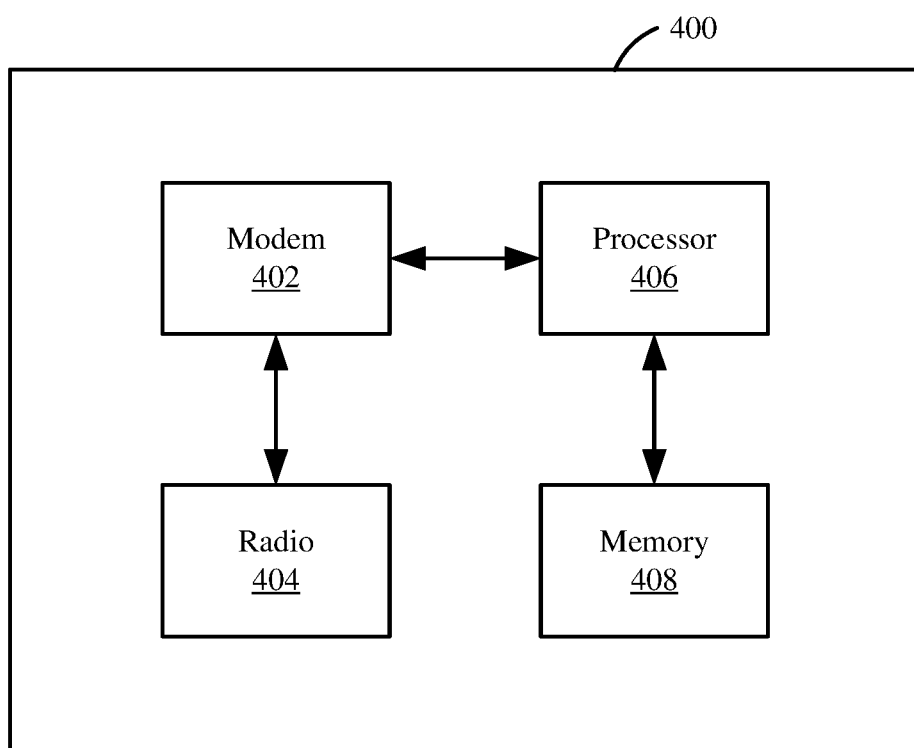
FIG. 4 shows a block diagram of an example wireless communication device.

FIG. 4 shows a block diagram of an example wireless communication device 400. In some implementations, the wireless communication device 400 can be an example of a device for use in a STA such as one of the STAs 104 described with reference to FIG. 1. In some implementations, the wireless communication device 400 can be an example of a device for use in an AP such as the AP 102 described with reference to FIG. 1. The wireless communication device 400 is capable of transmitting (or outputting for transmission) and receiving wireless communications (for example, in the form of wireless packets). For example, the wireless communication device can be configured to transmit and receive packets in the form of physical layer convergence protocol (PLCP) protocol data units (PPDUs) and medium access control (MAC) protocol data units (MPDUs) conforming to an IEEE 802.11 wireless communication protocol standard, such as that defined by the IEEE 802.11-2016 specification or amendments thereof including, but not limited to, 802.11ah, 802.11ad, 802.11ay, 802.11ax, 802.11az, 802.11ba and 802.11be.

The wireless communication device 400 can be, or can include, a chip, system on chip (SoC), chipset, package or device that includes one or more modems 402, for example, a Wi-Fi (IEEE 802.11 compliant) modem. In some implementations, the one or more modems 402 (collectively "the modem 402") additionally include a WWAN modem (for example, a 3GPP 4G LTE or 5G compliant modem). In some implementations, the wireless communication device 400 also includes one or more radios 404 (collectively "the radio 404"). In some implementations, the wireless communication device 406 further includes one or more processors, processing blocks or processing elements 406 (collectively "the processor 406") and one or more memory blocks or elements 408 (collectively "the memory 408").

The modem 402 can include an intelligent hardware block or device such as, for example, an application-specific integrated circuit (ASIC) among other possibilities. The modem 402 is generally configured to implement a PHY layer. For example, the modem 402 is configured to modulate packets and to output the modulated packets to the radio 404 for transmission over the wireless medium. The modem 402 is similarly configured to obtain modulated packets received by the radio 404 and to demodulate the packets to provide demodulated packets. In addition to a modulator and a demodulator, the modem 402 may further include digital signal processing (DSP) circuitry, automatic gain control (AGC), a coder, a decoder, a multiplexer and a demultiplexer. For example, while in a transmission mode, data obtained from the processor 406 is provided to a coder, which encodes the data to provide encoded bits. The encoded bits are then mapped to points in a modulation constellation (using a selected MCS) to provide modulated symbols. The modulated symbols may then be mapped to a number $N_{SS}$ of spatial streams or a number $N_{STS}$ of space-time streams. The modulated symbols in the respective spatial or space-time streams may then be multiplexed, transformed via an inverse fast Fourier transform (IFFT) block, and subsequently provided to the DSP circuitry for Tx windowing and filtering. The digital signals may then be provided to a digital-to-analog converter (DAC). The resultant analog signals may then be provided to a frequency upconverter, and ultimately, the radio 404. In implementations involving beamforming, the modulated symbols in the respective spatial streams are precoded via a steering matrix prior to their provision to the IFFT block.

While in a reception mode, digital signals received from the radio 404 are provided to the DSP circuitry, which is configured to acquire a received signal, for example, by detecting the presence of the signal and estimating the initial timing and frequency offsets. The DSP circuitry is further configured to digitally condition the digital signals, for example, using channel (narrowband) filtering, analog impairment conditioning (such as correcting for I/Q imbalance), and applying digital gain to ultimately obtain a narrowband signal. The output of the DSP circuitry may then be fed to the AGC, which is configured to use information extracted from the digital signals, for example, in one or more received training fields, to determine an appropriate gain. The output of the DSP circuitry also is coupled with the demodulator, which is configured to extract modulated symbols from the signal and, for example, compute the logarithm likelihood ratios (LLRs) for each bit position of each subcarrier in each spatial stream. The demodulator is coupled with the decoder, which may be configured to process the LLRs to provide decoded bits. The decoded bits from all of the spatial streams are then fed to the demultiplexer for demultiplexing. The demultiplexed bits may then be descrambled and provided to the MAC layer (the processor 406) for processing, evaluation or interpretation.

The radio 404 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may, in turn, be coupled to one or more antennas. For example, in some implementations, the wireless communication device 400 can include, or be coupled with, multiple transmit antennas (each with a corresponding transmit chain) and multiple receive antennas (each with a corresponding receive chain). The symbols output from the modem 402 are provided to the radio 404, which then transmits the symbols via the coupled antennas.

Similarly, symbols received via the antennas are obtained by the radio 404, which then provides the symbols to the modem 402.

The processor 406 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 406 processes information received through the radio 404 and the modem 402, and processes information to be output through the modem 402 and the radio 404 for transmission through the wireless medium. For example, the processor 406 may implement a control plane and MAC layer configured to perform various operations related to the generation and transmission of MPDUs, frames or packets. The MAC layer is configured to perform or facilitate the coding and decoding of frames, spatial multiplexing, space-time block coding (STBC), beamforming, and OFDMA resource allocation, among other operations or techniques. In some implementations, the processor 406 may generally control the modem 402 to cause the modem to perform various operations described above.

The memory 408 can include tangible storage media such as random-access memory (RAM) or read-only memory (ROM), or combinations thereof. The memory 408 also can store non-transitory processor- or computer-executable software (SW) code containing instructions that, when executed by the processor 406, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 5B:
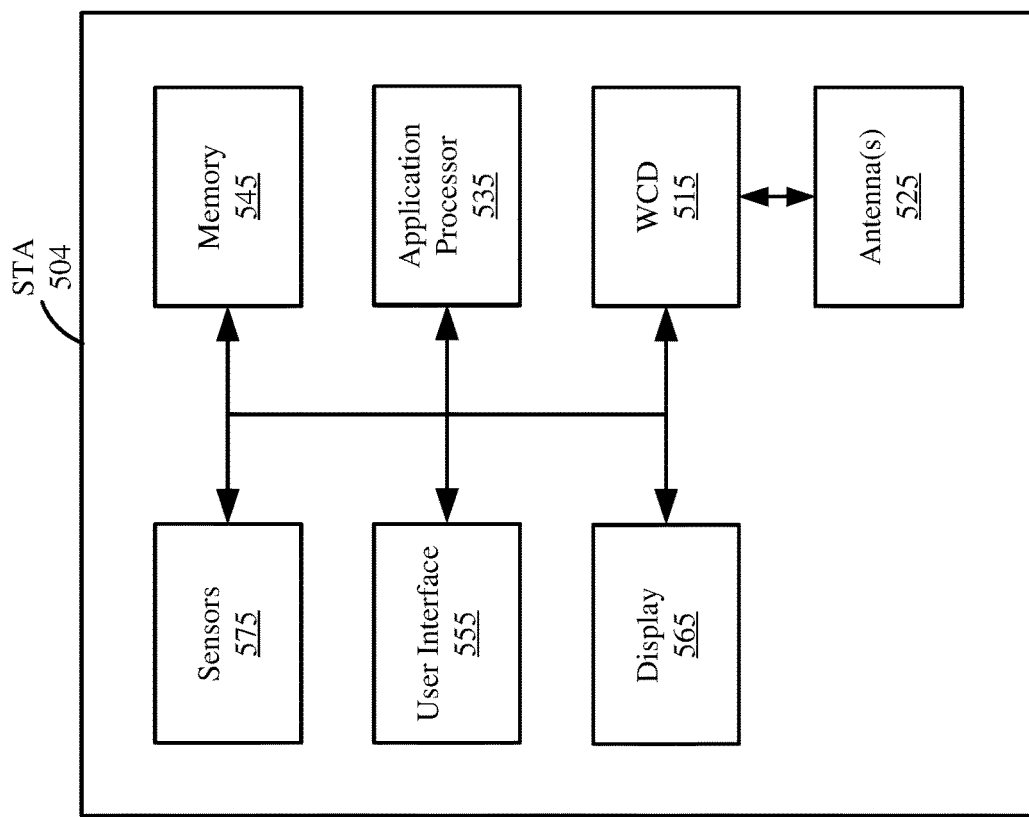
FIG. 5B shows a block diagram of an example STA.
Figure 5A:
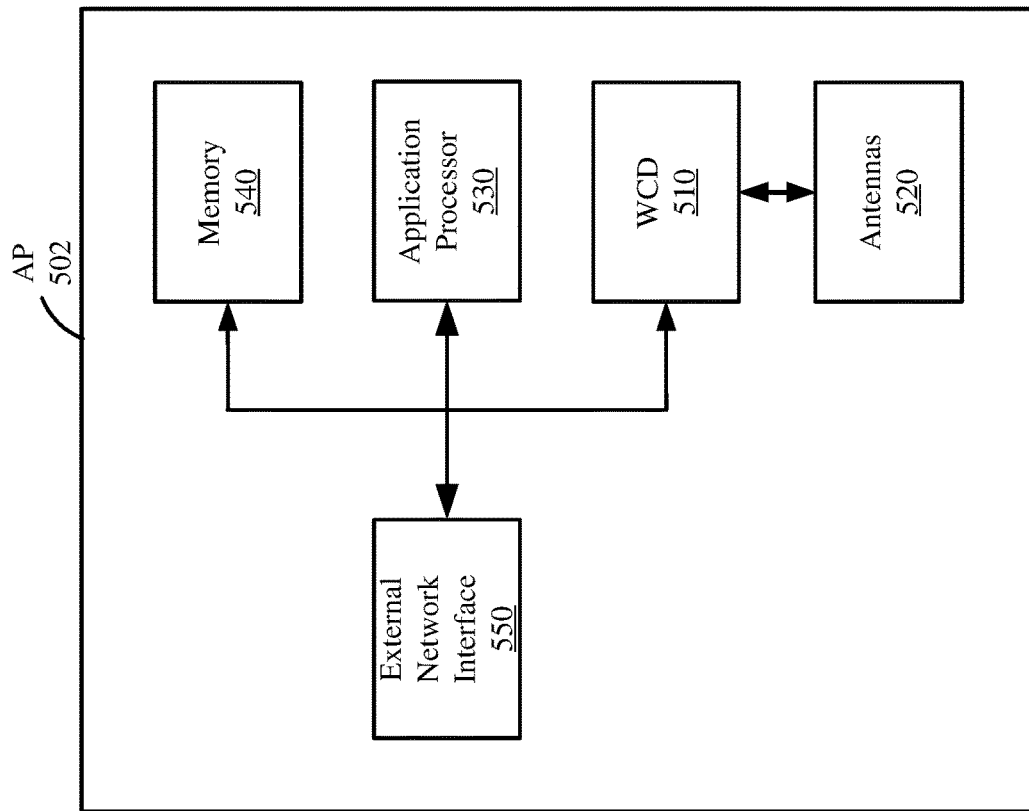
FIG. 5A shows a block diagram of an example AP.

FIG. 5A shows a block diagram of an example AP 502. For example, the AP 502 can be an example implementation of the AP 102 described with reference to FIG. 1. The AP 502 includes a wireless communication device (WCD) 510 (although the AP 502 may itself also be referred to generally as a wireless communication device as used herein). For example, the wireless communication device 510 may be an example implementation of the wireless communication device 400 described with reference to FIG. 4. The AP 502 also includes multiple antennas 520 coupled with the wireless communication device 510 to transmit and receive wireless communications. In some implementations, the AP 502 additionally includes an application processor 530 coupled with the wireless communication device 510, and a memory 540 coupled with the application processor 530. The AP 502 further includes at least one external network interface 550 that enables the AP 502 to communicate with a core network or backhaul network to gain access to external networks including the Internet. For example, the external network interface 550 may include one or both of a wired (for example, Ethernet) network interface and a wireless network interface (such as a WWAN interface). Ones of the aforementioned components can communicate with other ones of the components directly or indirectly, over at least one bus. The AP 502 further includes a housing that encompasses the wireless communication device 510, the application processor 530, the memory 540, and at least portions of the antennas 520 and external network interface 550.

FIG. 5B shows a block diagram of an example STA 504. For example, the STA 504 can be an example implementation of the STA 104 described with reference to FIG. 1. The STA 504 includes a wireless communication device 515 (although the STA 504 may itself also be referred to generally as a wireless communication device as used herein). For example, the wireless communication device 515 may be an example implementation of the wireless communication device 400 described with reference to FIG. 4. The STA 504 also includes one or more antennas 525 coupled with the wireless communication device 515 to transmit and receive wireless communications. The STA 504 additionally includes an application processor 535 coupled with the wireless communication device 515, and a memory 545 coupled with the application processor 535. In some implementations, the STA 504 further includes a user interface (UI) 555 (such as a touchscreen or keypad) and a display 565, which may be integrated with the UI 555 to form a touchscreen display. In some implementations, the STA 504 may further include one or more sensors 575 such as, for example, one or more inertial sensors, accelerometers, temperature sensors, pressure sensors, or altitude sensors. Ones of the aforementioned components can communicate with other ones of the components directly or indirectly, over at least one bus. The STA 504 further includes a housing that encompasses the wireless communication device 515, the application processor 535, the memory 545, and at least portions of the antennas 525, UI 555, and display 565.

As described above, a STA may trigger a roaming procedure when the signal quality (such as RSSI) of wireless communications with its associated AP falls below a threshold level. According to existing versions of the IEEE 802.11 standard, a STA may initiate a roaming procedure by scanning all available wireless channels for a new AP to roam to. More specifically, a STA may scan for roaming candidates by broadcasting probe requests or listening for beacons on each available channel. However, the STA must pause or suspend wireless communications with its associated AP when dwelling on other wireless channels. Moreover, if the best roaming candidate operates on a new wireless channel, the STA must additionally wait for a channel grant before it can resume communications on the new wireless channel. As such, roaming scans may significantly affect the throughput or latency of communications by the STA.

Aspects of the present disclosure recognize that OBSSs exist in many wireless communication environments (particularly in dense or crowded environments). An OBSS is any BSS having an overlapping coverage area, and operating on the same wireless channel, as another BSS. The IEEE 802.11ax amendment, and later generations, of the IEEE 802.11 standard supports concurrent packet transmissions in two or more OBSSs through BSS coloring and spatial reuse. More specifically, spatial reuse may be permitted among OBSSs that are associated with different BSS colors. A "BSS color collision" occurs when two or more OBSSs are associated with the same BSS color. A STA that support the IEEE 802.11ax amendment may listen to wireless communications from OBSSs to detect and report BSS color collisions to its associated AP. As used herein, the term "OBSS detection period" refers to the time at which the STA listens to such wireless communications from OBSSs.

Various aspects relate generally to wireless roaming, and more particularly, to roaming candidate selection based on OBSS detection. For example, a STA may periodically listen for wireless communications from OBSSs (during an OBSS detection period) as part of a BSS color collision reporting procedure. In some aspects, the STA may identify one or more OBSSs based on wireless communications detected during one or more OBSS detection periods and may roam to a new AP based on the previously identified OBSSs when a roaming condition is satisfied (such as when the signal quality of wireless communications with its associated AP falls below a threshold level). More specifically, any OBSS (or AP) identified during the OBSS detection periods may be a potential roaming candidate for the STA. In some implementations, the STA may store information associated with each identified OBSS in an OBSS table. Such information may include, for example, a BSSID and a candidate score indicating a suitability of the OBSS as a roaming candidate for the STA. When the roaming condition is satisfied, the STA may listen for packets (such as beacon or probe response frames) from other APs operating on its current wireless channel. If the STA detects a packet from one or more APs that match the OBSS table, the STA may roam to the matching AP with the highest candidate score.

Particular implementations of the subject matter described in this disclosure can be implemented to realize one or more of the following potential advantages. By identifying roaming candidates based on wireless communications detected during OBSS detection periods, aspects of the present disclosure may leverage existing STA functionality to improve the speed and efficiency of wireless roaming. For example, STAs operating in accordance with the IEEE 802.11ax amendment, and later generations, of the IEEE 802.11 standard may periodically listen for wireless communications from OBSSs as part of a BSS color collision reporting procedure. By storing a record of each AP identified during an OBSS detection period, a STA may assess the suitability of each AP as a roaming candidate even before a roaming condition is satisfied. Thus, when the roaming condition is satisfied, the STA can quickly select a suitable AP to roam to without scanning all available wireless channels. More specifically, the STA may roam to a new AP without leaving its current wireless channel. As such, the STA does not need to suspend communications with its associated AP or wait for a channel grant to resume communications with the new AP.

Figure 6:
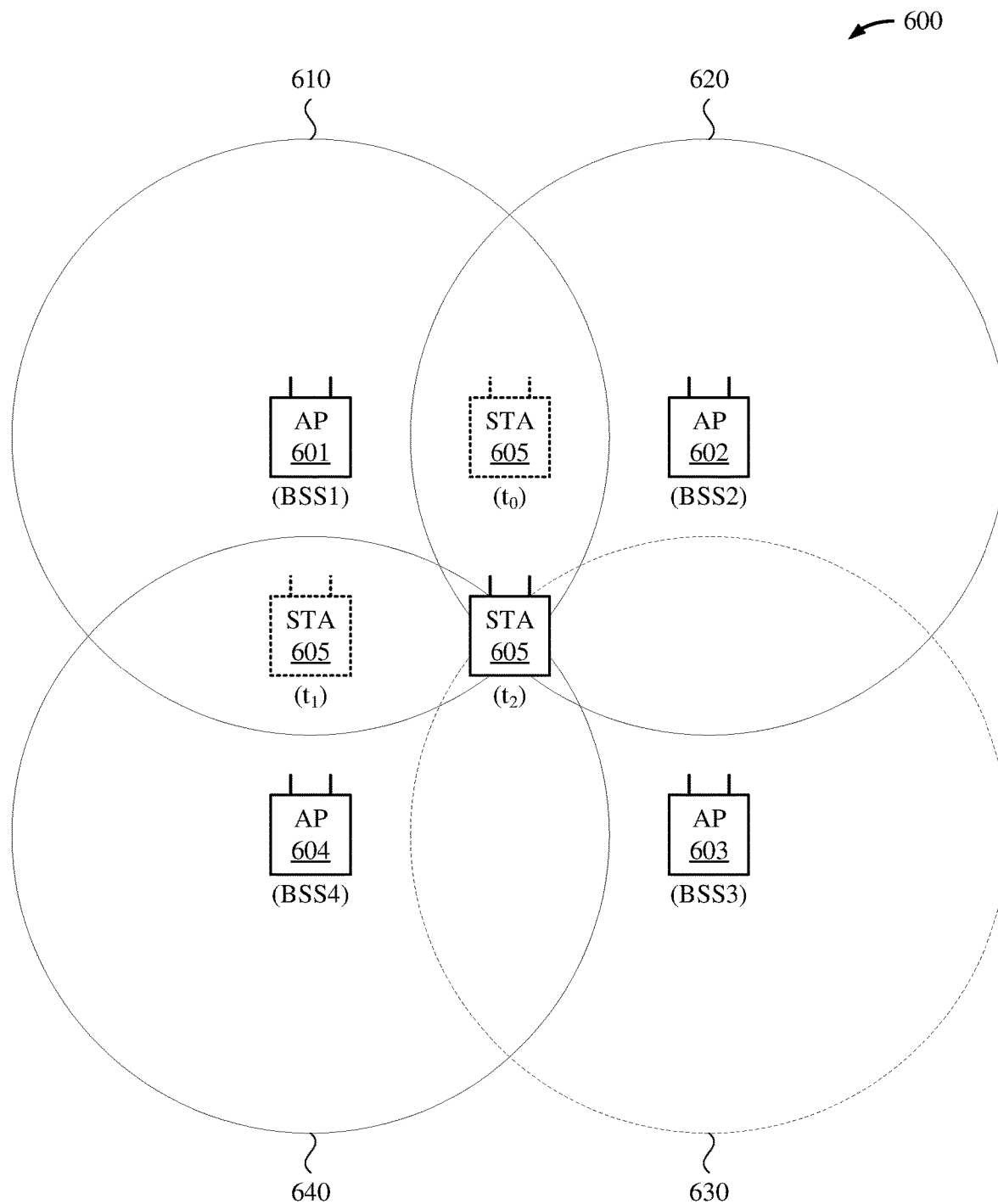
FIG. 6 shows an example communication environment with overlapping basic service sets (OBSSs) according to some implementations.

FIG. 6 shows an example communication environment 600 with overlapping basic service sets (OBSSs) according to some implementations. More specifically, the example communication environment 600 includes a number of APs 601-604 and a STA 605. In some implementations, the STA 605 may be one example of any of the STAs 104 or 504 of FIGS. 1 and 5B, respectively. In some implementations, each of the APs 601-604 may be one example of any of the APs 102 or 502 of FIGS. 1 and 5A, respectively. The APs 601-604 may represent BSSs (BSS1-BSS4) having coverage areas 610-640, respectively.

As shown in FIG. 6, the APs 601, 602, and 604 are configured to operate on the same wireless channel and have overlapping coverage areas 610, 620, and 640, respectively. Accordingly, BSS1, BSS2, and BSS4 represent OBSSs. In contrast, the AP 603 is configured to operate on a different wireless channel than the APs 601, 602, and 604. Thus, even though the coverage area 630 overlaps the coverage areas 610, 620, and 640, BSS3 is not an OBSS with BSS1, BSS2, or BSS4. To distinguish the OBSSs (BSS1, BSS2, and BSS4) from the non-overlapping BSS (BSS3) in FIG. 6, the coverage areas 610, 620, and 640 are drawn with solid lines whereas the coverage area 630 is drawn with a dotted line.

In the example of FIG. 6, the STA 605 is initially associated with the AP 601 as the STA 605 moves through the communication environment 600, such as from times $t_0$ to $t_2$. However, the signal quality of wireless communications with the associated AP 601 may deteriorate as the STA 605 moves further away from the AP 601. For example, at time $t_2$, the STA 605 is located at the edge of the coverage area 610. As a result, the RSSI of its wireless communications with the associated AP 601 may fall below a threshold level at which a roaming condition is satisfied. Thus, at time $t_2$, the STA 605 may search for a new (target) AP to roam to.

Existing versions of the IEEE 802.11 standard describe a roaming procedure that can be triggered when the signal quality falls below a threshold level. According to the existing roaming procedure, the STA 605 may first perform a roaming scan to detect other APs (or BSSs) in its vicinity. More specifically, the STA 605 may listen for beacons or broadcast probe requests (and listen for probe responses) on each of its supported channels. For example, the STA 605 may listen for beacon or probe response frames on its current wireless channel (such as from the APs 602 and 604) and also may listen for beacon or probe response frames on other wireless channels (such as from the AP 603).

After receiving management frames (such as beacons or probe responses) from the APs 602-604, the STA 605 may select one of the APs 602, 603, or 604 to roam to based on various candidate selection criteria. Example candidate selection criteria may include, among other examples, RSSI, bandwidth, and supported capabilities. As described above, this scanning procedure consumes significant time and resources. Moreover, if the AP 603 is selected as the target AP, the STA 605 must wait for a channel grant before it can begin transmitting on the new wireless channel.

In some implementations, the AP 601 may support BSS color collision reporting. As such, the STA 605 may periodically listen for packets (or PPDUs) in OBSSs (such as every 4000 ms) to detect BSS color collisions on its current wireless channel. More specifically, the STA 605 may report a BSS color collision if it detects a PPDU with at least three address fields (such as a receiver address, a transmitter address, and a BSSID) in the MAC header, and with the same BSS color as its associated AP 601, in which none of the address fields match the BSSID of the associated AP 601 (or any other BSSIDs in the same multiple BSSID set to which its BSS belongs).

In some aspects, the STA 605 may store, in an OBSS table, information acquired from any packets detected during each OBSS detection period. As described above, such packets may carry information about one or more OBSSs in the communication environment 600 or indicate one or more characteristics or qualities of wireless communications in such OBSSs (collectively referred to herein as "OBSS information"). Aspects of the present disclosure recognize that some OBSSs may be suitable roaming candidates for the STA 605. Thus, in some implementations, the STA 605 may use the OBSS table in selecting a target AP to roam to when the roaming condition is satisfied. As such, the OBSS information stored in the OBSS table may include at least the BSSID associated with each OBSS.

In some implementations, the OBSS information may further include an RSSI, timestamp, bandwidth, or other information indicating one or more characteristics associated with the detected packets. In some other implementations, the OBSS information may further include one or more capabilities supported by each OBSS. Still further, in some implementations, the OBSS information may further include a respective candidate score for each OBSS. The candidate score may indicate a suitability of the OBSS as a roaming candidate for the STA 605. For example, the candidate score may be determined based on various candidate selection criteria (such as RSSI, bandwidth, or supported capabilities).

When the roaming condition is satisfied, the STA 605 may attempt to roam to an OBSS identified by its OBSS table. For example, the STA 605 may first determine whether it is in the coverage area of one or more OBSSs in its OBSS table (such as by listening for packet transmissions on its current wireless channel). If the STA 605 is in the coverage area of one or more OBSSs, the STA 605 may roam to the OBSS with the highest candidate score. In some implementations, the STA 605 may roam to the OBSS without scanning any other available channels. However, if the STA 605 is not in the coverage area of any OBSSs in its OBSS table (or if the OBSS table is empty), the STA 605 may perform a conventional roaming scan to search for a target AP to roam to. In other words, the STA 605 may scan all available wireless channels for roaming candidates.

In the example of FIG. 6, the STA 605 may listen for wireless communications in OBSSs at times $t_0$ and $t_1$. During the first OBSS detection period, at time $t_0$, the STA 605 may detect a packet transmitted to, or from, the AP 602. In some implementations, the STA 605 may acquire OBSS information from the packet transmitted to, or from, the AP 602 and may store the OBSS information in an OBSS table. During the second OBSS detection period, at time $t_1$, the STA 605 may detect a packet transmitted tor, or frame, the AP 604. In some implementations, the STA 605 may acquire OBSS information from the packets transmitted to, or from, the AP 604 and may store the OBSS information in an OBSS table. Table 1 shows an example OBSS table that can be used to store the OBSS information associated with the APs 602 and 604.

TABLE 1

| BSSID | RSSI | Supported Capabilities | Bandwidth | Timestamp | Score |
|---|---|---|---|---|---|
| BSS2 | −50 dBm | Capabilities_BSS2 | 160 MHz | $t_0$ | 10 |
| BSS4 | −60 dBm | Capabilities_BSS4 | 80 MHz | $t_1$ | 6 |

With reference for example to Table 1, the packet detected at time to has a bandwidth equal to 160 MHz and an RSSI equal to −50 dBm and carries BSS capability information (such as in a capabilities element) indicating a set of capabilities supported by BSS2 (Capabilities_BSS2). In some implementations, the STA 605 may determine that BSS2 has a candidate score equal to 10 based on one or more candidate scoring metrics (such as RSSI, bandwidth, or supported capabilities). The packet detected at time $t_1$ has a bandwidth equal to 80 MHz and an RSSI equal to −60 dBm and carries BSS capability information indicating a set of capabilities supported by BSS4 (Capabilities_BSS4). In some implementations, the STA 605 may determine that BSS4 has a candidate score equal to 7 based on the one or more candidate scoring metrics.

As shown in FIG. 6, the STA 605 is located at the intersection of the coverage areas 610-640, at time $t_2$, when the roaming condition is satisfied. Because the coverage areas 620 and 640 are associated with BSSIDs in the OBSS table (Table 1), the STA 605 may select one of the APs 602 or 604 as its target AP for roaming. More specifically, the STA 605 may not scan any other wireless channels for additional roaming candidates. As such, the STA 605 may not detect the presence or availability of the AP 603. With reference for example to Table 1. BSS2 (AP 602) has a higher candidate score than BSS4 (AP 604). The candidate score indicates a suitability of the BSS as a roaming candidate for the STA 605. For example, BSSs with higher candidate scores may be better roaming candidates than BSSs with lower candidate scores. Thus, in the example of FIG. 6, the STA 605 may roam to the AP 602, for example, by disassociating with the AP 601 and associating (or reassociating) with the AP 602.

In the example of FIG. 6, each of the APs 601, 602, and 604 may support BSS color collision reporting. Aspects of the present disclosure recognize that, if the STA 605 is associated with an AP that does not support BSS color collision reporting, the STA 605 may not periodically listen for wireless communications in OBSSs. As such, the STA 605 may not detect the presence of OBSSs prior to determining that a roaming condition is satisfied. In some implementations, to ensure that the STA 605 can continue to detect OBSSs periodically, the STA 605 may prioritize roaming candidates that support BSS color collision reporting (such as APs operating in accordance with the IEEE 802.11ax amendment, or later generations, of the IEEE 802.11 standard). For example, the STA 605 may only store OBSS information associated with BSSs that support BSS color collision reporting.

Figure 7:
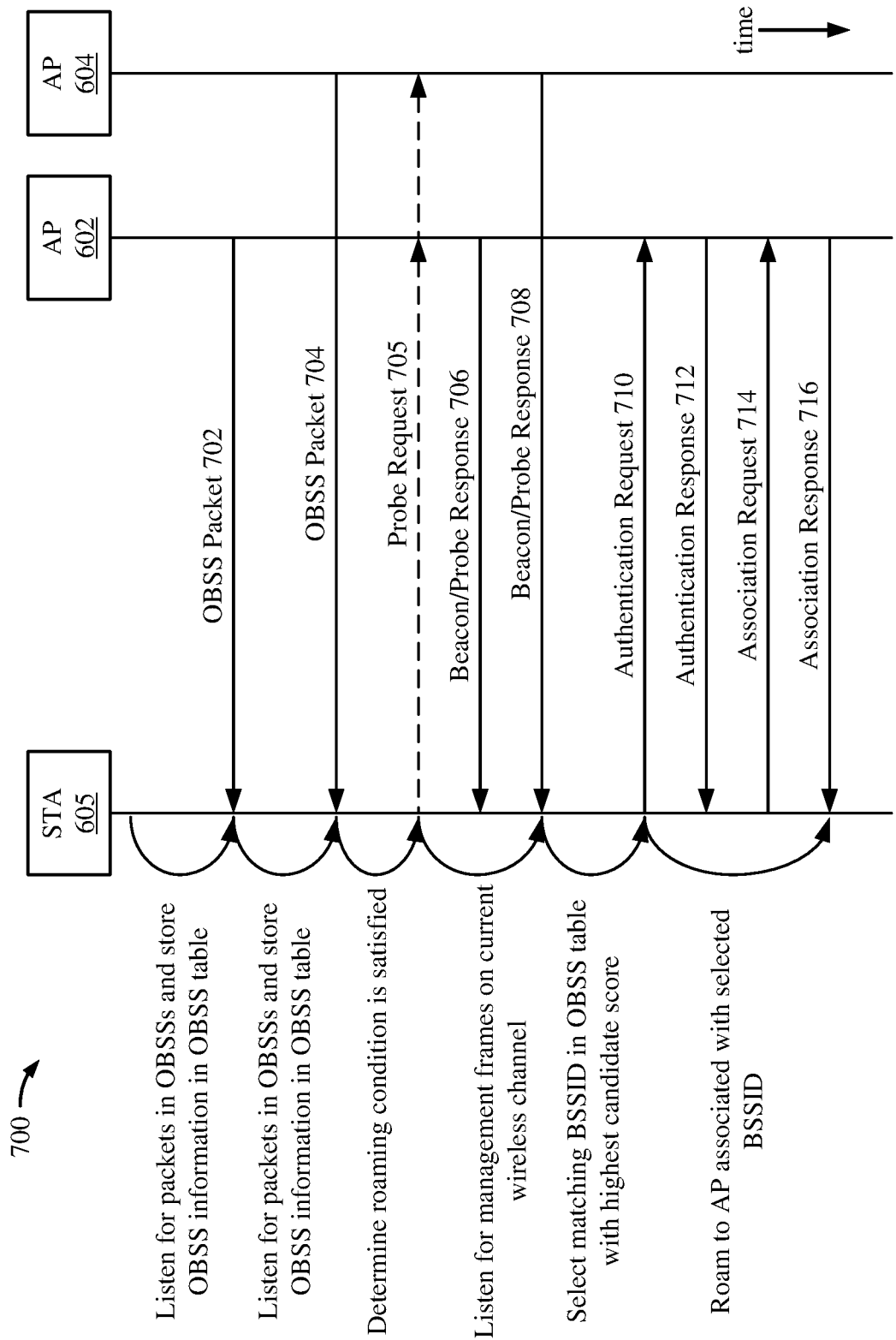
FIG. 7 shows a sequence diagram depicting an example message exchange between a STA and a number of APs according to some implementations.

FIG. 7 shows a sequence diagram depicting an example message exchange 700 between a STA and a number of APs according to some implementations. With reference for example to FIG. 6, the example message exchange 700 may be performed between the STA 605 and the APs 602 and 604 while the STA 605 is associated with the AP 601. In some implementations, the STA 605 may periodically listen for wireless communications or packet transmissions in OBSSs. For example, the STA 605 may listen for such packet transmissions as part of a BSS color collision reporting mechanism supported by its associated AP 601.

During a first OBSS detection period (such as at time to), the STA 605 detects an OBSS packet 702 from the AP 602. For example, the OBSS packet 702 may be a PPDU transmitted to the AP 602 by a STA in the OBSS. Alternatively, the OBSS packet 702 may be a PPDU transmitted by the AP 602 to a STA in the OBSS. In some implementations, the STA 605 may acquire OBSS information associated with the AP 602 (or BSS2) based on the OBSS packet 702 and may store such OBSS information in an OBSS table. Such OBSS information may include, for example, a timestamp associated with the OBSS packet 702, an RSSI of the OBSS packet 702, a bandwidth of the OBSS packet 702, a BSSID associated with the AP 602 (or BSS2), or one or more capabilities supported by the AP 602 (or BSS2).

During a second OBSS detection period (such as at time $t_1$), the STA 605 detects an OBSS packet 704 from the AP 604. For example, the OBSS packet 704 may be a PPDU transmitted to the AP 604 by a STA in the OBSS. Alternatively, the OBSS packet 704 may be a PPDU transmitted by the AP 604 to a STA in the OBSS. In some implementations, the STA 605 may acquire OBSS information associated with the AP 602 (or BSS2) based on the OBSS packet 704 and may store such OBSS information in the OBSS table. Such OBSS information may include, for example, a timestamp associated with the OBSS packet 704, an RSSI of the OBSS packet 704, a bandwidth of the OBSS packet 704, a BSSID associated with the AP 604 (or BSS4), or one or more capabilities supported by the AP 604 (or BSS4).

When the STA 605 determines that a roaming condition is satisfied (such as at time $t_2$), the STA 605 may listen for management frames on its current wireless channel. In some implementations, the STA 605 may listen for beacon frames broadcast by other APs operating on the current wireless channel. In some other implementations, the STA 605 may broadcast a probe request frame 705 on the current wireless channel and listen for probe response frames responsive to the probe request 705. Because the STA 605 does not dwell on other wireless channels, any ongoing data traffic with its associated AP 601 may continue uninterrupted. While listening to the wireless channel, the STA 605 receives one or more beacon or probe response frames 706 from the AP 602 and receives one or more beacon or probe response frames 708 from the AP 604.

The STA 605 compares the information carried in each beacon or probe response frame it receives with the information stored in the OBSS table to determine whether the STA 605 is in the coverage area of a previously identified OBSS. For example, each of the beacon or probe response frames 706 may have an address field set to the BSSID associated with the AP 602 (or BSS2). Thus, the STA 605 may determine that the address field of each beacon or probe response frame 706 matches a BSSID (BSS2) in the OBSS table. Similarly, each of the beacon or probe response frames 708 may have an address field set to the BSSID associated with the AP 604 (or BSS4). Thus, the STA 605 may determine that the address field of each beacon or probe response frame 708 also matches a BSSID (BSS4) in the OBSS table.

In some implementations, the STA 605 may select the matching BSSID with the highest candidate score in the OBSS table and roam to the AP associated with the selected BSSID. With reference for example to Table 1, BSS2 has a higher candidate score than BSS4. Thus, the STA 605 may roam to the AP 602, for example, by transmitting an authentication request 710 to the AP 602, receiving an authentication response 712 from the AP 602, transmitting an association request 714 to the AP 602, and receiving an association response 716 from the AP 602. In some implementations, the STA 605 may further disassociate with the AP 601 (not shown for simplicity). Because the STA 605 and the AP 602 operate on the same wireless channel, the STA 605 may proceed to communicate with the AP 602 without having to wait for a channel grant.

Figure 8:
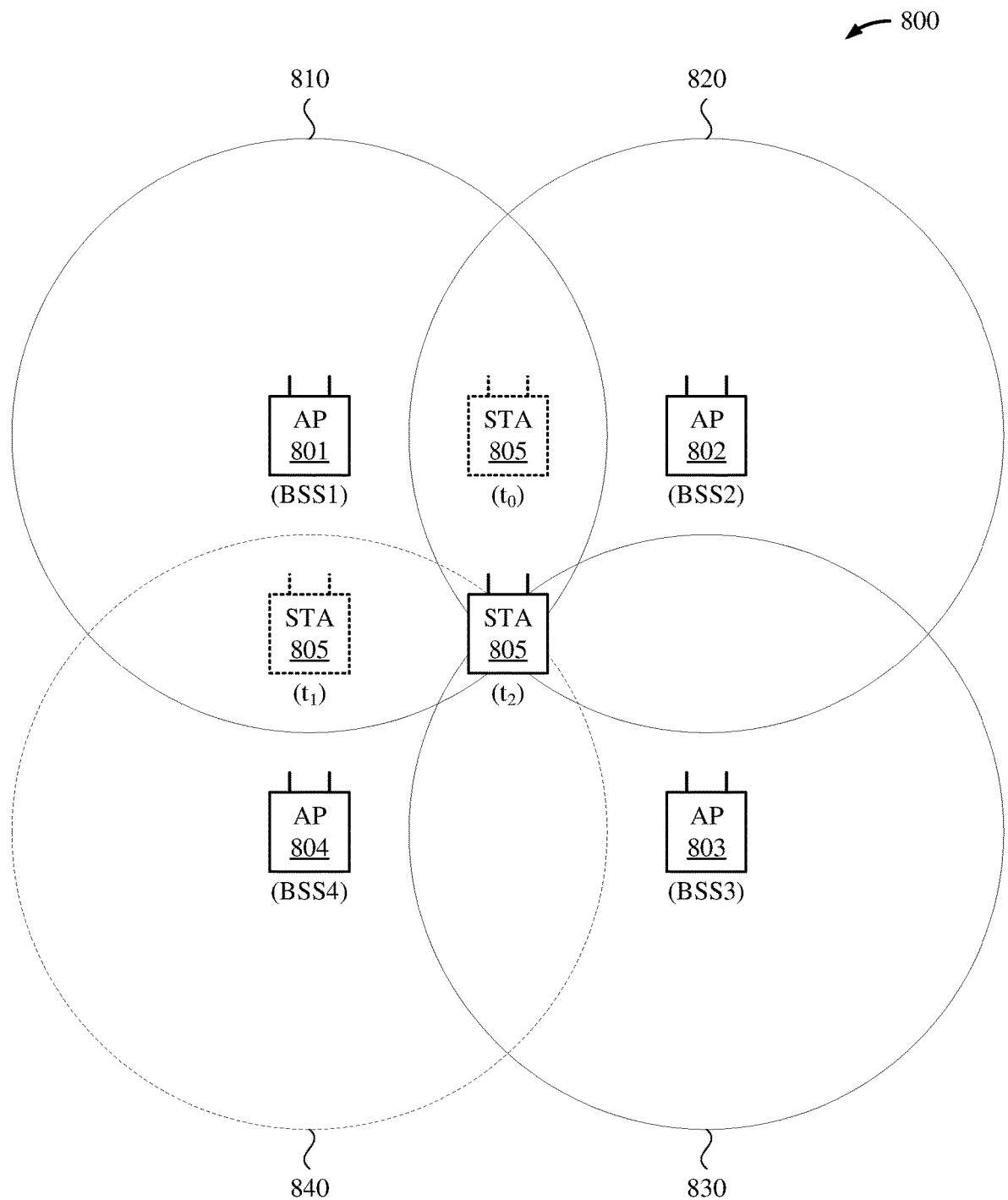
FIG. 8 shows an example communication environment with OBSSs according to some implementations.

FIG. 8 shows an example communication environment 800 with OBSSs according to some implementations. More specifically, the example communication environment 800 includes a number of APs 801-804 and a STA 805. In some implementations, the STA 805 may be one example of the STA 605 of FIG. 6. In some implementations, each of the APs 801-804 may be one example of any of the APs 102 or 502 of FIGS. 1 and 5A, respectively. The APs 801-804 may represent BSSs (BSS1-BSS4) having coverage areas 810-840, respectively.

As shown in FIG. 8, the APs 801-803 are configured to operate on the same wireless channel and have overlapping coverage areas 810-830, respectively. Accordingly, BSS1, BSS2, and BSS3 represent OBSSs. In contrast, the AP 804 is configured to operate on a different wireless channel than the APs 801-803. Thus, even though the coverage area 840 overlaps the coverage areas 810-830, BSS4 is not an OBSS with BSS1, BSS2, or BSS3. To distinguish the OBSSs (BSS1, BSS2, and BSS3) from the non-overlapping BSS (BSS4) in FIG. 8, the coverage areas 810, 820, and 830 are drawn with solid lines whereas the coverage area 840 is drawn with a dotted line.

In the example of FIG. 8, the STA 805 is initially associated with the AP 801 as the STA 805 moves through the communication environment 800, such as from times $t_0$ to $t_2$. However, the signal quality of wireless communications with the associated AP 801 may deteriorate as the STA 805 moves further away from the AP 801. For example, at time $t_2$, the STA 805 is located at the edge of the coverage area 810. As a result, the RSSI of its wireless communications with the associated AP 801 may fall below a threshold level at which a roaming condition is satisfied. Thus, at time $t_2$, the STA 805 may search for a new (target) AP to roam to.

In some implementations, the AP 801 may support BSS color collision reporting. As such, the STA 805 may periodically listen for packets (or PPDUs) in OBSSs to detect BSS color collisions on its current wireless channel. In some aspects, the STA 805 may store, in an OBSS table, OBSS information acquired from any packets detected during each OBSS detection period. As described with reference to FIG. 8, such OBSS information may include at least the BSSID associated with each OBSS. In some implementations, the OBSS information may further include an RSSI, timestamp, bandwidth, or other information indicating one or more characteristics associated with the detected packets. In some other implementations, the OBSS information may further include one or more capabilities supported by each OBSS. Still further, in some implementations, the OBSS information may further include a respective candidate score for each OBSS.

In the example of FIG. 8, the STA 805 may listen for wireless communications in OBSSs at times $t_0$ and $t_1$. During the first OBSS detection period, at time $t_0$, the STA 805 may detect a packet transmitted to, or from, the AP 802. In some implementations, the STA 805 may acquire OBSS information from the packet transmitted to, or from, the AP 802 and may store the OBSS information in an OBSS table. During the second OBSS detection period, at time $t_1$, the STA 805 is not in the coverage area of an OBSS. As such, the STA 805 may not detect any packets transmitted to, or from, another AP. Table 2 shows an example OBSS table that can be used to store the OBSS information associated with the AP 802.

TABLE 2

| BSSID | RSSI | Supported Capabilities | Bandwidth | Timestamp | Score |
|---|---|---|---|---|---|
| BSS2 | −60 dBm | Capabilities_BSS2 | 40 MHZ | $t_0$ | 4 |

With reference for example to Table 2, the packet detected at time $t_0$ has a bandwidth equal to 40 MHz and an RSSI equal to −60 dBm and carries BSS capability information (such as in a capabilities element) indicating a set of capabilities supported by BSS2 (Capabilities_BSS2). In some implementations, the STA 805 may determine that BSS2 has a candidate score equal to 4 based on one or more candidate scoring metrics (such as RSSI, bandwidth, or supported capabilities).

As shown in FIG. 8, the STA 805 is located at the intersection of the coverage areas 810-840, at time $t_2$, when the roaming condition is satisfied. Although BSS3 is an OBSS with BSS1 and BSS2, the STA 805 has not detected BSS3 (or AP 803) during any previous OBSS detection periods. Thus, because only the coverage area 820 is associated with a BSSID in the OBSS table (Table 2), the STA 805 may select the AP 802 as its target AP for roaming. More specifically, the STA 805 may not scan any other wireless channels for additional roaming candidates. As such, STA 805 may not detect the presence or availability of the AP 803. Thus, in the example of FIG. 8, the STA 805 may roam to the AP 802, for example, by disassociating with the AP 801 and associating (or reassociating) with the AP 802.

In the example of FIG. 8, each of the APs 801-803 may support BSS color collision reporting. In some implementations, to ensure that the STA 805 can continue to detect OBSSs periodically, the STA 805 may prioritize roaming candidates that support BSS color collision reporting (such as APs operating in accordance with the IEEE 802.11ax amendment, or later generations, of the IEEE 802.11 standard). For example, the STA 805 may only store OBSS information associated with BSSs that support BSS color collision reporting.

Figure 9:
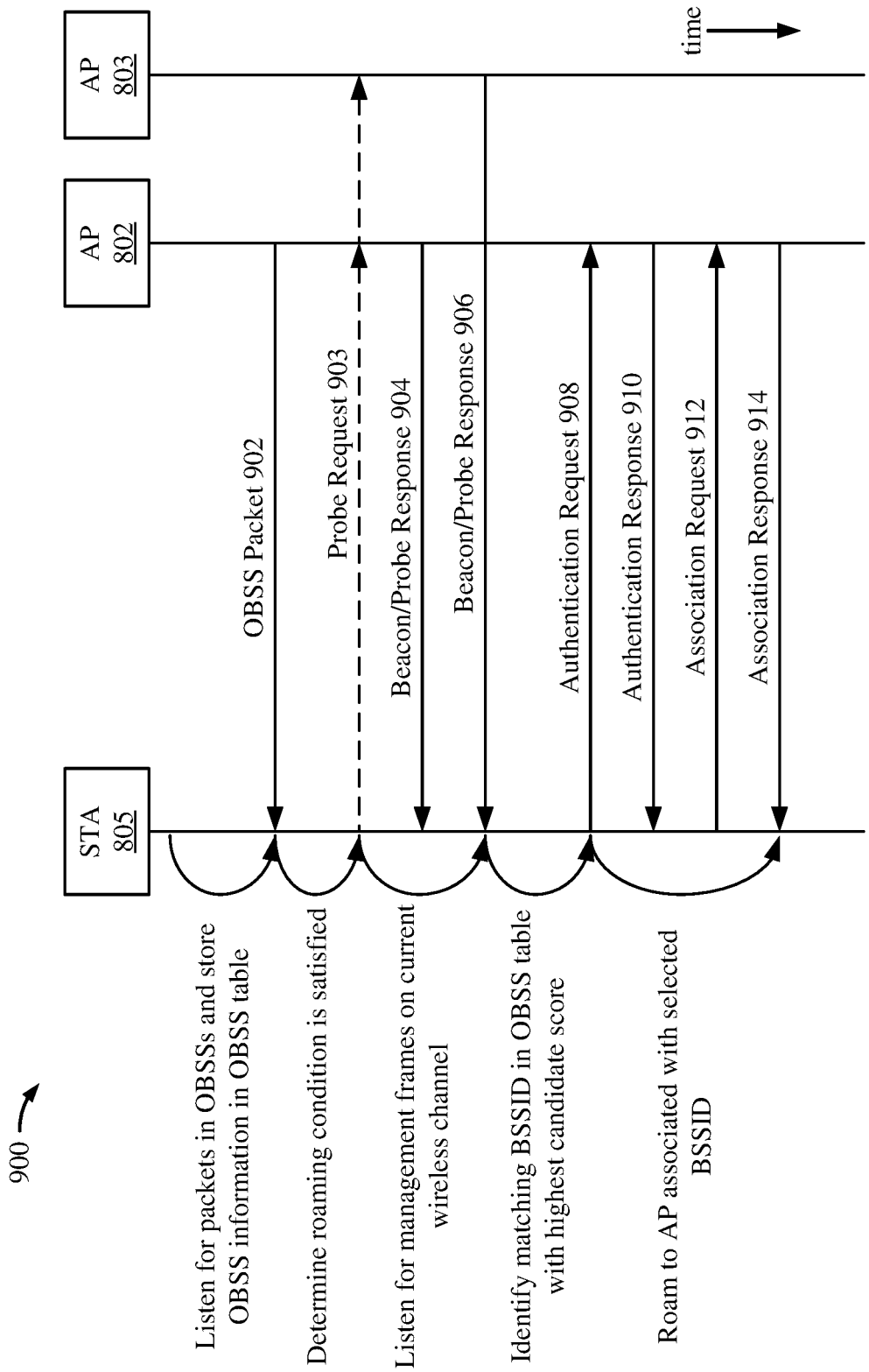
FIG. 9 shows a sequence diagram depicting an example message exchange between a STA a number of APs according to some implementations.

FIG. 9 shows a sequence diagram depicting an example message exchange 900 between a STA a number of APs according to some implementations. With reference for example to FIG. 8, the example message exchange 900 may be performed between the STA 805 and the APs 802 and 803 while the STA 805 is associated with the AP 801. In some implementations, the STA 805 may periodically listen for wireless communications or packet transmissions in OBSSs. For example, the STA 805 may listen for such packet transmissions as part of a BSS color collision reporting mechanism supported by its associated AP 801.

During an OBSS detection period (such as at time to), the STA 805 detects an OBSS packet 902 from the AP 802. For example, the OBSS packet 902 may be a PPDU transmitted to the AP 802 by a STA in the OBSS. Alternatively, the OBSS packet 902 may be a PPDU transmitted by the AP 802 to a STA in the OBSS. In some implementations, the STA 805 may acquire OBSS information associated with the AP 802 (or BSS2) based on the OBSS packet 902 and may store such OBSS information in an OBSS table. Such OBSS information may include, for example, a timestamp associated with the OBSS packet 902, an RSSI of the OBSS packet 902, a bandwidth of the OBSS packet 902, a BSSID associated with the AP 802 (or BSS2), or one or more capabilities supported by the AP 802 (or BSS2).

When the STA 805 determines that a roaming condition is satisfied (such as at time $t_2$), the STA 805 may listen for management frames on its current wireless channel. In some implementations, the STA 805 may listen for beacon frames broadcast by other APs operating on the current wireless channel. In some other implementations, the STA 805 may broadcast a probe request frame 903 on the current wireless channel and listen for probe response frames responsive to the probe request 903. Because the STA 805 does not dwell on other wireless channels, any ongoing data traffic with its associated AP 801 may continue uninterrupted. While listening to the wireless channel, the STA 805 receives one or more beacon or probe response frames 904 from the AP 802 and receives one or more beacon or probe response frames 906 from the AP 803.

The STA 805 compares the information carried in each beacon or probe response frame it receives with the information stored in the OBSS table to determine whether the STA 805 is in the coverage area of a previously identified OBSS. For example, each of the beacon or probe response frames 904 may have an address field set to the BSSID associated with the AP 802 (or BSS2). Thus, the STA 805 may determine that the address field of each beacon or probe response frame 904 matches a BSSID (BSS2) in the OBSS table. Similarly, each of the beacon or probe response frames 906 may have an address field set to the BSSID associated with the AP 804 (or BSS4). However, the STA 805 may determine that none of the address fields of the beacon or probe response frames 906 match any BSSIDs in the OBSS table. In some implementations, the STA 805 may not analyze a suitability of the AP 804 as a roaming candidate (such as by determining a candidate score).

In some implementations, the STA 805 may select the matching BSSID with the highest candidate score in the OBSS table and roam to the AP associated with the selected BSSID. With reference for example to Table 2, BSS2 is the only BSSID stored in the OBSS table. Thus, the STA 805 may roam to the AP 802, for example, by transmitting an authentication request 908 to the AP 802, receiving an authentication response 910 from the AP 802, transmitting an association request 912 to the AP 802, and receiving an association response 914 from the AP 802. In some implementations, the STA 805 may further disassociate with the AP 801 (not shown for simplicity). Because the STA 805 and the AP 802 operate on the same wireless channel, the STA 805 may proceed to communicate with the AP 802 without having to wait for a channel grant.

Figure 10:
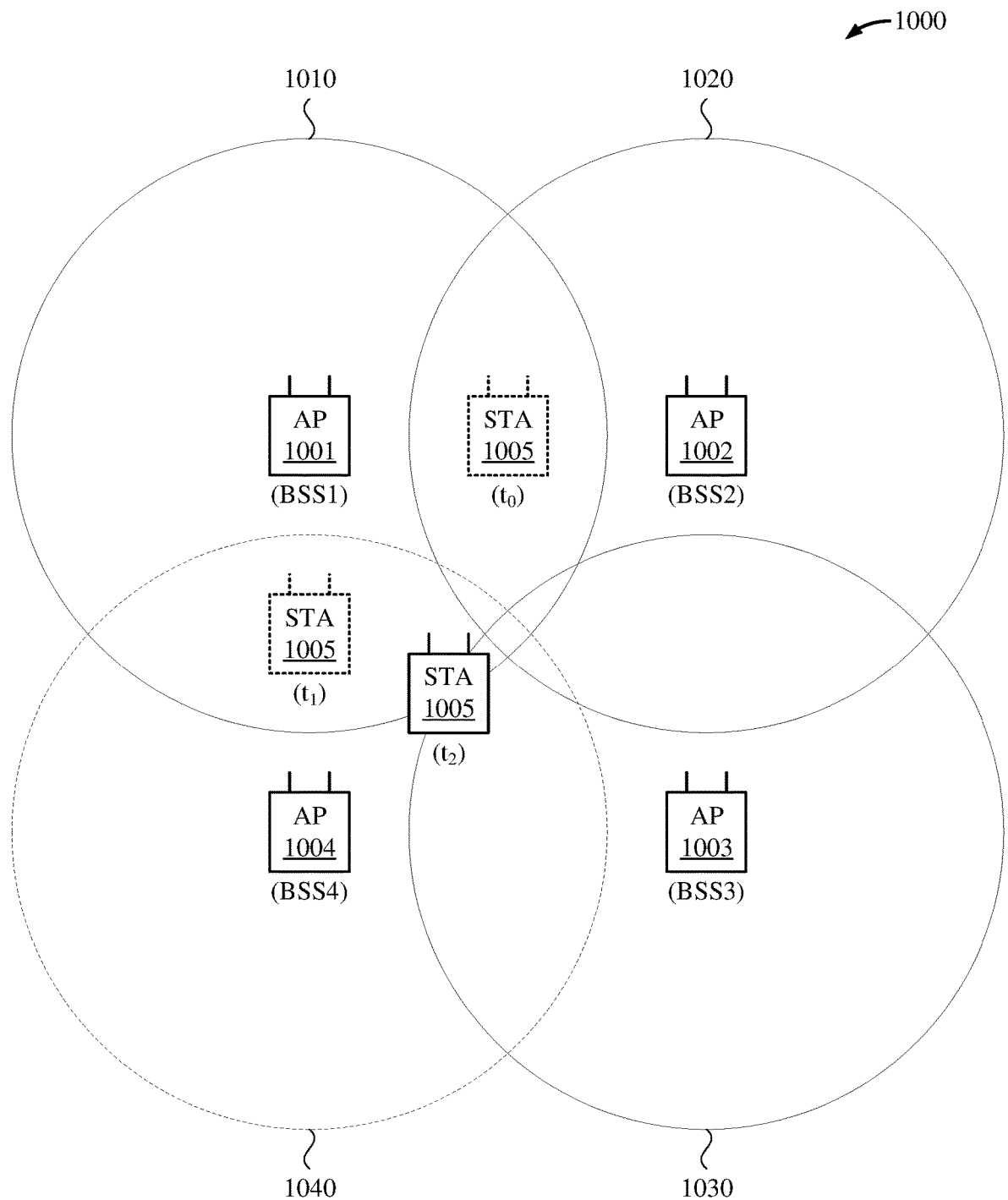
FIG. 10 shows an example communication environment with OBSSs according to some implementations.

FIG. 10 shows an example communication environment 1000 with OBSSs according to some implementations. More specifically, the example communication environment 1000 includes a number of APs 1001-1004 and a STA 1005. In some implementations, the STA 1005 may be one example of any of the STAs 605 or 805 of FIGS. 6 and 8, respectively. In some implementations, each of the APs 1001-1004 may be one example of any of the APs 102 or 502 of FIGS. 1 and 5A, respectively. The APs 1001-1004 may represent BSSs (BSS1-BSS4) having coverage areas 1010-1040, respectively.

As shown in FIG. 10, the APs 1001-1003 are configured to operate on the same wireless channel and have overlapping coverage areas 1010-1030, respectively. Accordingly, BSS1, BSS2, and BSS3 represent OBSSs. In contrast, the AP 1004 is configured to operate on a different wireless channel than the APs 1001-1003. Thus, even though the coverage area 1040 overlaps the coverage areas 1010-1030, BSS4 is not an OBSS with BSS1, BSS2, or BSS3. To distinguish the OBSSs (BSS1, BSS2, and BSS3) from the non-overlapping BSS (BSS4) in FIG. 10, the coverage areas 1010, 1020, and 1030 are drawn with solid lines whereas the coverage area 1040 is drawn with a dotted line.

In the example of FIG. 10, the STA 1005 is initially associated with the AP 1001 as the STA 1005 moves through the communication environment 1000, such as from times $t_0$ to $t_2$. However, the signal quality of wireless communications with the associated AP 1001 may deteriorate as the STA 1005 moves further away from the AP 1001. For example, at time $t_2$, the STA 1005 is located at the edge of the coverage area 1010. As a result, the RSSI of its wireless communications with the associated AP 1001 may fall below a threshold level at which a roaming condition is satisfied. Thus, at time $t_2$, the STA 1005 may search for a new (target) AP to roam to.

In some implementations, the AP 1001 may support BSS color collision reporting. As such, the STA 1005 may periodically listen for packets (or PPDUs) in OBSSs to detect BSS color collisions on its current wireless channel. In some aspects, the STA 1005 may store, in an OBSS table, OBSS information acquired from any packets detected during each OBSS detection period. As described with reference to FIG. 10, such OBSS information may include at least the BSSID associated with each OBSS. In some implementations, the OBSS information may further include an RSSI, timestamp, bandwidth, or other information indicating one or more characteristics associated with the detected packets. In some other implementations, the OBSS information may further include one or more capabilities supported by each OBSS. Still further, in some implementations, the OBSS information may further include a respective candidate score for each OBSS.

In the example of FIG. 10, the STA 1005 may listen for wireless communications in OBSSs at times $t_0$ and $t_1$. During the first OBSS detection period, at time $t_0$, the STA 1005 may detect a packet transmitted to, or from, the AP 1002. In some implementations, the STA 1005 may acquire OBSS information from the packet transmitted to, or from, the AP 1002 and may store the OBSS information in an OBSS table. During the second OBSS detection period, at time $t_1$, the STA 1005 is not in the coverage area of an OBSS. As such, the STA 1005 may not detect any packets transmitted to, or from, another AP. Table 3 shows an example OBSS table that can be used to store the OBSS information associated with the AP 1002.

TABLE 3

| BSSID | RSSI | Supported Capabilities | Bandwidth | Timestamp | Score |
|---|---|---|---|---|---|
| BSS2 | −50 dBm | Capabilities_BSS2 | 160 MHz | $t_0$ | 10 |

With reference for example to Table 3, the packet detected at time to has a bandwidth equal to 160 MHz and an RSSI equal to −50 dBm and carries BSS capability information (such as in a capabilities element) indicating a set of capabilities supported by BSS2 (Capabilities_BSS2). In some implementations, the STA 1005 may determine that BSS2 has a candidate score equal to 10 based on one or more candidate scoring metrics (such as RSSI, bandwidth, or supported capabilities).

As shown in FIG. 10, the STA 1005 is located at the intersection of the coverage areas 1010, 1030, and 1040 but outside the coverage area 1020, at time $t_2$, when the roaming condition is satisfied. Although BSS3 is an OBSS with BSS1 and BSS2, the STA 1005 has not detected BSS3 (or AP 1003) during any previous OBSS detection periods. As a result, the STA 1005 is not located within any coverage area that is associated with a BSSID in the OBSS table (Table 3). In some implementations, the STA 1005 may perform a roaming scan upon determining that the STA 1005 is not within the coverage area of a previously identified OBSS. For example, the STA 1005 may scan all available wireless channels for roaming candidates and select a target AP to roam to from among the identified roaming candidates.

Figure 11:
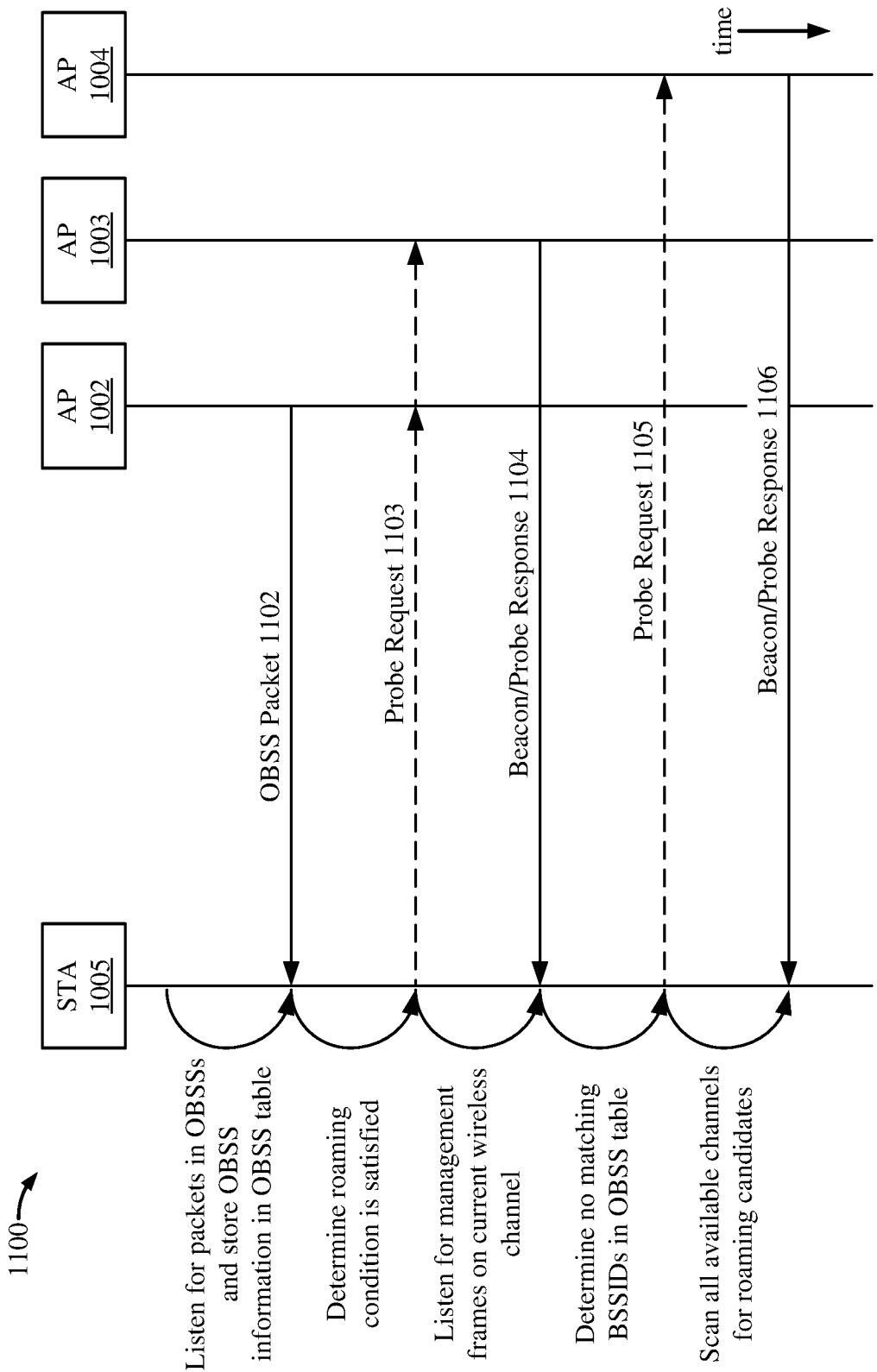
FIG. 11 shows a sequence diagram depicting an example message exchange between a STA a number of APs according to some implementations.

FIG. 11 shows a sequence diagram depicting an example message exchange 1100 between a STA a number of APs according to some implementations. With reference for example to FIG. 10, the example message exchange 1100 may be performed between the STA 1005 and the APs 1002-1004 while the STA 1005 is associated with the AP 1001. In some implementations, the STA 1005 may periodically listen for wireless communications or packet transmissions in OBSSs. For example, the STA 1005 may listen for such packet transmissions as part of a BSS color collision reporting mechanism supported by its associated AP 1001.

During an OBSS detection period (such as at time to), the STA 1005 detects an OBSS packet 1102 from the AP 1002. For example, the OBSS packet 1102 may be a PPDU transmitted to the AP 1002 by a STA in the OBSS. Alternatively, the OBSS packet 1102 may be a PPDU transmitted by the AP 1002 to a STA in the OBSS. In some implementations, the STA 1005 may acquire OBSS information associated with the AP 1002 (or BSS2) based on the OBSS packet 1102 and may store such OBSS information in an OBSS table. Such OBSS information may include, for example, a timestamp associated with the OBSS packet 1102, an RSSI of the OBSS packet 1102, a bandwidth of the OBSS packet 1102, a BSSID associated with the AP 1002 (or BSS2), or one or more capabilities supported by the AP 1002 (or BSS2).

When the STA 1005 determines that a roaming condition is satisfied (such as at time $t_2$), the STA 1005 may listen for management frames on its current wireless channel. In some implementations, the STA 1005 may listen for beacon frames broadcast by other APs operating on the current wireless channel. In some other implementations, the STA 1005 may broadcast a probe request frame 1103 on the current wireless channel and listen for probe response frames responsive to the probe request 1103. While listening to the wireless channel, the STA 1005 receives one or more beacon or probe response frames 1104 from the AP 1003.

The STA 1005 compares the information carried in each beacon or probe response frame it receives with the information stored in the OBSS table to determine whether the STA 1005 is in the coverage area of a previously identified OBSS. For example, each of the beacon or probe response frames 1104 may have an address field set to the BSSID associated with the AP 1003 (or BSS3). However, the STA 1005 may determine that none of the address fields of the beacon or probe response frames 1104 match any BSSIDs in the OBSS table. Because the STA 1005 fails to receive a beacon or probe response frame having an address field that matches any of the BSSIDs in the OBSS table, the STA 1005 may determine that it is not within the coverage area of a previously identified OBSS.

In some implementations, the STA 1005 may perform a roaming scan upon determining that it is not within the coverage area of a previously identified OBSS when the roaming condition is satisfied. For example, the STA 1005 may dwell on one or more additional wireless channels (such as the channel on which the AP 1004 operates) to listen for management frames. In some implementations, the STA 1005 may listen for beacon frames broadcast by other APs operation on the additional wireless channels. In some other implementations, the STA 1005 may broadcast probe request frames 1105 on the additional wireless channels and listen for probe response frames responsive to the probe requests 1105. As a result of the roaming scan, the STA 1005 may receive one or more beacon or probe response frames 1106 from the AP 1004.

After scanning all available channels, the STA 1005 may select a target AP from among the roaming candidates identified as a result of the scan. For example, the STA 1005 may determine a candidate score for each of the APs 1002-1004 based on one or more candidate scoring metrics (such as RSSI, bandwidth, or supported capabilities). The STA 1005 may select the AP with the highest candidate score and roam to the selected AP (such as described with reference to FIGS. 7 and 9).

Figure 12A:
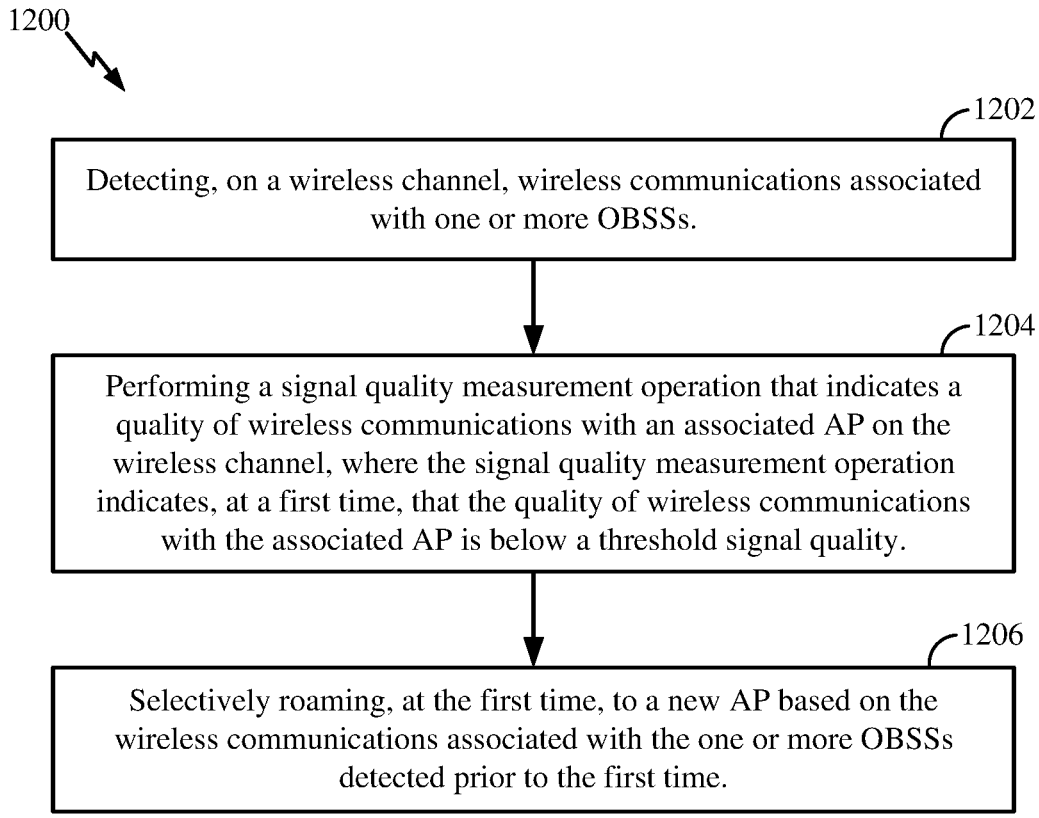
FIG. 12A shows a flowchart illustrating an example process for wireless communication that supports roaming candidate selection with OBSS detection according to some implementations.

FIG. 12A shows a flowchart illustrating an example process 1200 for wireless communication that supports roaming candidate selection with OBSS detection according to some implementations. In some other implementations, the process 1200 may be performed by a wireless communication device operating as or within a network node, such as any one of the STAs 605, 805, or 1005 of FIGS. 6, 8, and 10, respectively.

In some implementations, the process 1200 begins in block 1202 with detecting, on a wireless channel, wireless communications associated with one or more OBSSs. In some implementations, the wireless communication device may store a set of BSSIDs associated with the one or more OBSSs. In block 1204, the process 1200 proceeds with performing a signal quality measurement operation that indicates a quality of wireless communications with an associated AP on the wireless channel, where the signal quality measurement operation indicates, at a first time, that the quality of wireless communications with the associated AP is below a threshold signal quality. In block 1206, the process 1200 proceeds with selectively roaming, at the first time, to a new AP based on the wireless communications associated with the one or more OBSSs detected prior to the first time.

In some implementations, the wireless communication device may further store a respective candidate score associated with each BSSID in the set of BSSIDs, where each of the candidate scores indicates a suitability of a respective OBSS of the one or more OBSSs as a roaming candidate for the wireless communication device. In some other implementations, the wireless communication device may store BSS information associated with each BSSID in the set of BSSIDs, where the BSS information associated with each BSSID indicates one or more capabilities supported by a respective OBSS of the one or more OBSSs. Still further, in some implementations, the wireless communication device may store wireless signal information associated with each BSSID in the set of BSSIDs, where the wireless signal information associated with each BSSID indicates one or more characteristics associated with a respective wireless communication of the detected wireless communications. In some implementations, the one or more characteristics may include at least one of an RSSI, a timestamp, or a bandwidth.

Figure 12B:
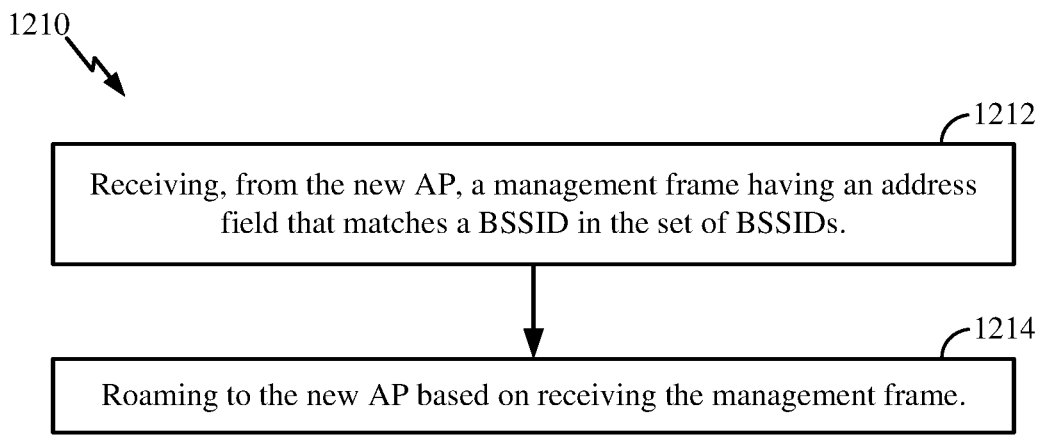
FIG. 12B shows a flowchart illustrating an example process for wireless communication that supports roaming candidate selection with OBSS detection according to some implementations.

FIG. 12B shows a flowchart illustrating an example process 1210 for wireless communication that supports roaming candidate selection with OBSS detection according to some implementations. In some other implementations, the process 1210 may be performed by a wireless communication device operating as or within a network node, such as any one of the STAs 605, 805, or 1005 of FIGS. 6, 8, and 10, respectively.

With reference for example to FIG. 12A, the process 1210 may be a more detailed implementation of the operation for selectively roaming to a new AP in block 1206 of the process 1200. For example, the process 1210 may begin, in block 1212, after the detecting of the wireless communications associated with one or more OBSSs in block 1202 and after the performing of the signal quality measurement operation in block 1204. In block 1212, the process 1210 begins by receiving, from the new AP, a management frame having an address field that matches a BSSID in the set of BSSIDs. In block 1214, the process 1210 proceeds with roaming to the new AP based on receiving the management frame.

Figure 12C:
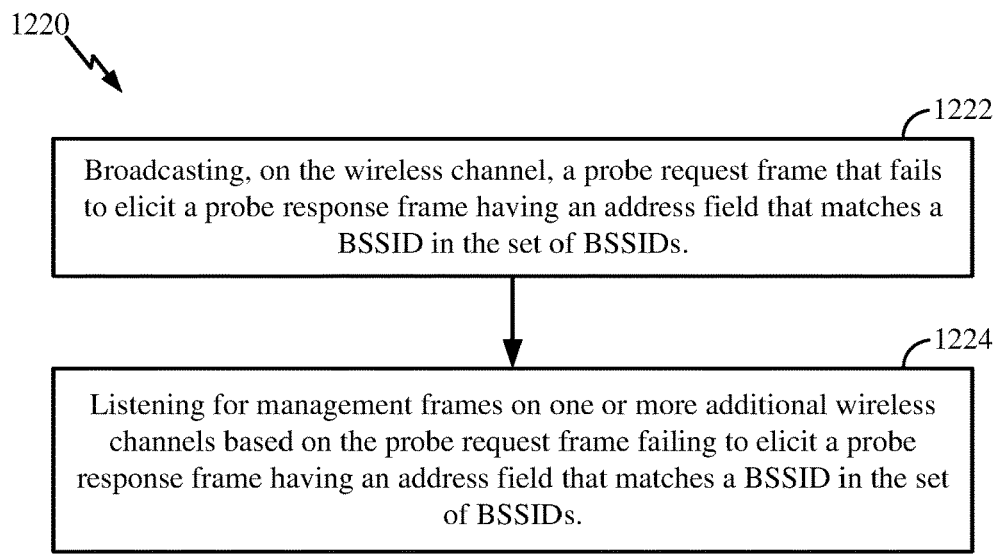
FIG. 12C shows a flowchart illustrating an example process for wireless communication that supports roaming candidate selection with OBSS detection according to some implementations.

FIG. 12C shows a flowchart illustrating an example process 1220 for wireless communication that supports roaming candidate selection with OBSS detection according to some implementations. In some other implementations, the process 1220 may be performed by a wireless communication device operating as or within a network node, such as any one of the STAs 605, 805, or 1005 of FIGS. 6, 8, and 10, respectively.

With reference for example to FIG. 12A, the process 1220 may begin, in block 1222, after the detecting of the wireless communications associated with one or more OBSSs in block 1202 and after the performing of the signal quality measurement operation in block 1204. In block 1222, the process 1220 begins by broadcasting, on the wireless channel, a probe request frame that fails to elicit a probe response frame having an address field that matches a BSSID in the set of BSSIDs. In block 1224, the process 1220 proceeds with listening for management frames on one or more additional wireless channels based on the probe request frame failing to elicit a probe response frame having an address field that matches a BSSID in the set of BSSIDs.

Figure 12D:
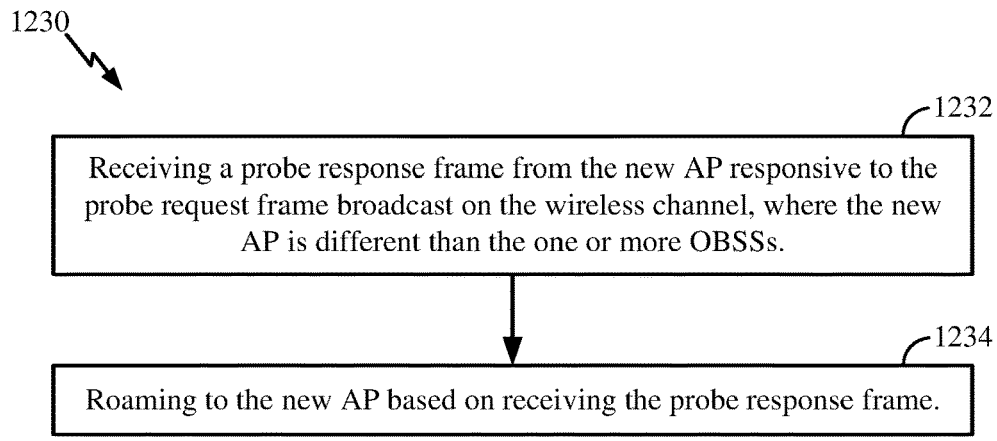
FIG. 12D shows a flowchart illustrating an example process for wireless communication that supports roaming candidate selection with OBSS detection according to some implementations.

FIG. 12D shows a flowchart illustrating an example process 1230 for wireless communication that supports roaming candidate selection with OBSS detection according to some implementations. In some other implementations, the process 1230 may be performed by a wireless communication device operating as or within a network node, such as any one of the STAs 605, 805, or 1005 of FIGS. 6, 8, and 10, respectively.

With reference for example to FIG. 12A, the process 1230 may be a more detailed implementation of the operation for selectively roaming to a new AP in block 1206 of the process 1200. With reference for example to FIG. 12C, the process 1230 may begin, in block 1232, after the broadcasting of the probe request in block 1222. In block 1232, the process 1230 begins by receiving a probe response frame from the new AP responsive to the probe request frame broadcast on the wireless channel, where the new AP is different than the one or more OBSSs. In block 1234, the process 1230 proceeds with roaming to the new AP based on receiving the probe response frame.

Figure 12E:
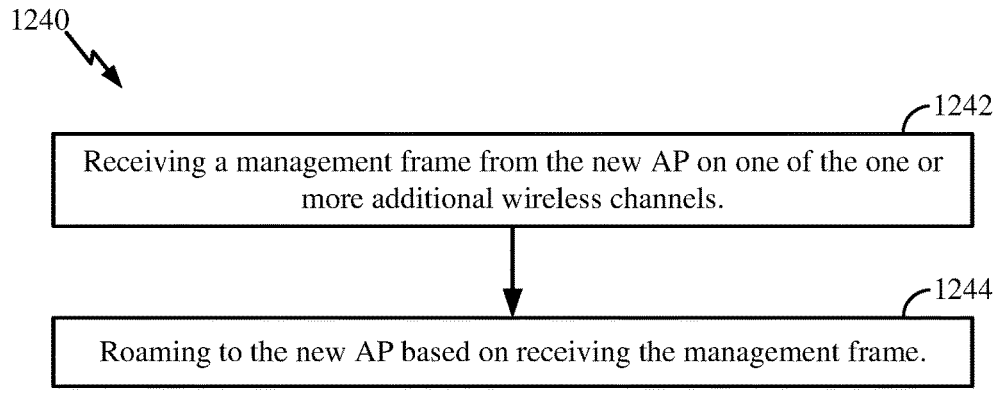
FIG. 12E shows a flowchart illustrating an example process for wireless communication that supports roaming candidate selection with OBSS detection according to some implementations.

FIG. 12E shows a flowchart illustrating an example process 1240 for wireless communication that supports roaming candidate selection with OBSS detection according to some implementations. In some other implementations, the process 1240 may be performed by a wireless communication device operating as or within a network node, such as any one of the STAs 605, 805, or 1005 of FIGS. 6, 8, and 10, respectively.

With reference for example to FIG. 12A, the process 1240 may be a more detailed implementation of the operation for selectively roaming to a new AP in block 1206 of the process 1200. With reference for example to FIG. 12C, the process 1240 may begin, in block 1242, after the broadcasting of the probe request in block 1222. In block 1242, the process 1240 begins by receiving a management frame from the new AP on one of the one or more additional wireless channels. In block 1244, the process 1240 proceeds with roaming to the new AP based on receiving the management frame.

Figure 13:
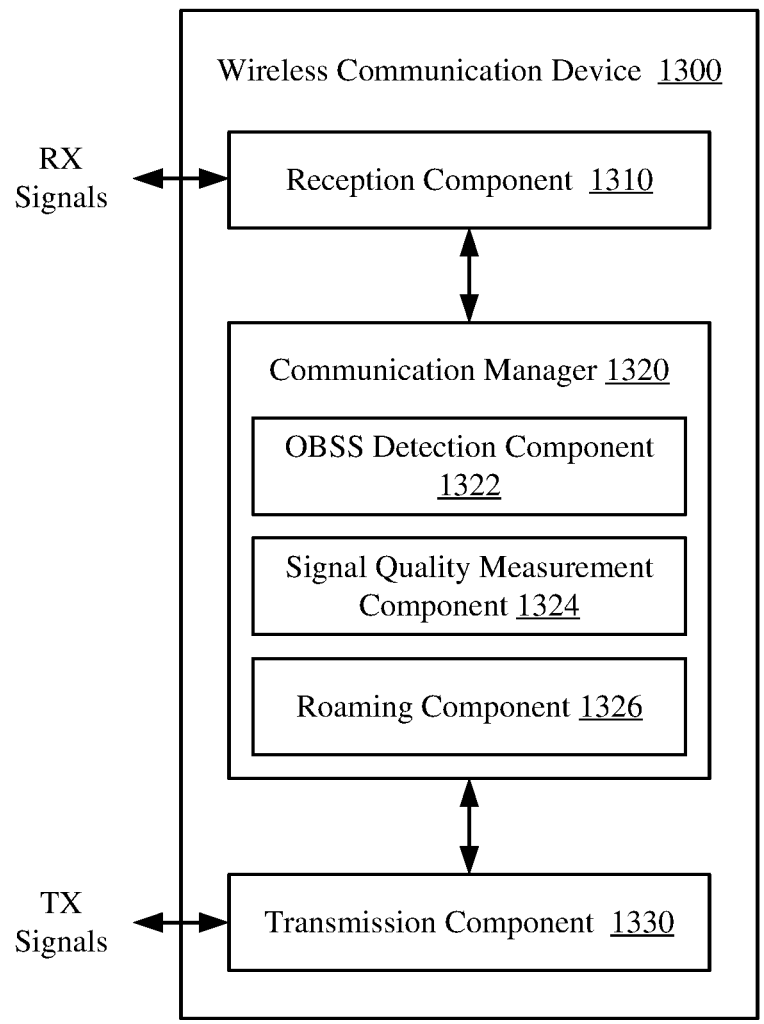
FIG. 13 shows a block diagram of an example wireless communication device according to some implementations.

FIG. 13 shows a block diagram of an example wireless communication device 1300 according to some implementations. In some implementations, the wireless communication device 1300 is configured to perform any of the processes 1200-1240 described above with reference to FIG. 12A-12E, respectively. The wireless communication device 1300 can be an example implementation of the wireless communication device 400 described above with reference to FIG. 4. For example, the wireless communication device 1300 can be a chip, SoC, chipset, package or device that includes at least one processor and at least one modem (for example, a Wi-Fi (IEEE 802.11) modem or a cellular modem).

The wireless communication device 1300 includes a reception component 1310, a communication manager 1320, and a transmission component 1330. The communication manager 1320 further includes an OBSS detection component 1322, a signal quality measurement component 1324, and a roaming component 1326. Portions of one or more of the components 1322, 1324, and 1326 may be implemented at least in part in hardware or firmware. In some implementations, at least some of the components 1322, 1324, or 1326 are implemented at least in part as software stored in a memory (such as the memory 408). For example, portions of one or more of the components 1322, 1324, and 1326 can be implemented as non-transitory instructions (or "code") executable by a processor (such as the processor 406) to perform the functions or operations of the respective component.

The reception component 1310 is configured to receive RX signals, over a wireless channel, from one or more other wireless communication devices. The communication manager 1320 is configured to control or manage communications with one or more other wireless communication devices. In some implementations, the OBSS detection component 1322 may detect, on the wireless channel, wireless communications associated with one or more OBSSs; the signal quality measurement component 1324 may map perform a signal quality measurement operation that indicates a quality of wireless communications with an associated AP on the wireless channel, where the signal quality measurement operation indicates, at a first time, that the quality of wireless communications with the associated AP is below a threshold signal quality; and the roaming component 1326 may selectively roam, at the first time, to a new AP based on the wireless communications associated with the one or more OBSSs detected prior to the first time. The transmission component 1330 is configured to transmit TX signals, over the wireless channel, to one or more other wireless communication devices.

Implementation examples are described in the following numbered clauses:

1. A method for wireless communication by a wireless communication device, including:
   detecting, on a wireless channel, wireless communications associated with one or more overlapping basic service sets (OBSSs);
   performing a signal quality measurement operation that indicates a quality of wireless communications with an associated access point (AP) on the wireless channel, the signal quality measurement operation indicating, at a first time, that the quality of wireless communications with the associated AP is below a threshold signal quality; and
   selectively roaming, at the first time, to a new AP based on the wireless communications associated with the one or more OBSSs detected prior to the first time.

2. The method of clause 1, further including: storing a set of BSS identifiers (BSSIDs) associated with the one or more OBSSs.

3. The method of any of clauses 1 or 2, further including:
   storing a respective candidate score associated with each BSSID in the set of BSSIDs, each of the candidate scores indicating a suitability of a respective OBSS of the one or more OBSSs as a roaming candidate for the wireless communication device.

4. The method of any of clauses 1-3, further including:
   storing wireless signal information associated with each BSSID in the set of BSSIDs, the wireless signal information associated with each BSSID indicating one or more characteristics associated with a respective wireless communication of the detected wireless communications.

5. The method of any of clauses 1-4, wherein the one or more characteristics include at least one of a received signal strength indication (RSSI), a timestamp, or a bandwidth.

6. The method of any of clauses 1-5, further including:
   storing BSS information associated with each BSSID in the set of BSSIDs, the BSS information associated with each BSSID indicating one or more capabilities supported by a respective OBSS of the one or more OBSSs.

7. The method of any of clauses 1-6, wherein the selective roaming to the new AP includes:
   receiving, from the new AP, a management frame having an address field that matches a BSSID in the set of BSSIDs; and
   roaming to the new AP based on receiving the management frame.

8. The method of any of clauses 1-6, further including:
   broadcasting, on the wireless channel, a probe request frame that fails to elicit a probe response frame having an address field that matches a BSSID in the set of BSSIDs; and
   listening for management frames on one or more additional wireless channels based on the probe request frame failing to elicit a probe response frame having an address field that matches a BSSID in the set of BSSIDs.

9. The method of any of clauses 1-6 or 8, wherein the selective roaming to the new AP includes:
   receiving a probe response frame from the new AP responsive to the probe request frame broadcast on the wireless channel, the new AP being different than the one or more OBSSs; and
   roaming to the new AP based on receiving the probe response frame.

10. The method of any of clauses 1-6 or 8, wherein the selective roaming to the new AP includes:
    receiving a management frame from the new AP on one of the one or more additional wireless channels; and
    roaming to the new AP based on receiving the management frame.

11. A wireless communication device including:
    at least one processor; and
    at least one memory communicatively coupled with the at least one processor and storing processor-readable code that, when executed by the at least one processor, is configured to perform the method of any one or more of clauses 1-10.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a wireless communication device, comprising:
    detecting, on a current wireless channel of the wireless communication device, wireless communications associated with one or more overlapping basic service sets (OBSSs) during an OBSS detection period;
    performing a signal quality measurement operation that indicates a quality of wireless communications with an associated access point (AP) on the current wireless channel, the signal quality measurement operation indicating, at a first time after the OBSS detection period, that the quality of wireless communications with the associated AP is below a threshold signal quality; and
    selectively roaming, at the first time after the OBSS detection period, to a new AP that is associated with a first OBSS of the one or more OBSSs, wherein the selective roaming is associated with information indicating one or more characteristics of the wireless communications associated with each OBSS of the one or more OBSSs during the OBSS detection period or one or more supported capabilities associated with each OBSS of the one or more OBSSs during the OBSS detection period.

2. The method of claim 1, further comprising:
    storing a set of BSS identifiers (BSSIDs) associated with the one or more OBSSs, each BSSID in the set of BSSIDs being identified in accordance with the detected wireless communications associated with a respective OBSS of the one or more OBSSs.

3. The method of claim 2, further comprising:
    storing a respective candidate score associated with each BSSID in the set of BSSIDs, each of the candidate scores indicating a suitability of a respective OBSS of the one or more OBSSs as a roaming candidate for the wireless communication device.

4. The method of claim 1, wherein the wireless communications are detected in accordance with one or more BSS color collisions.

5. The method of claim 2, wherein the selective roaming to the new AP comprises:
    receiving, from the new AP, a management frame having an address field that matches a BSSID in the set of BSSIDs; and
    roaming to the new AP in accordance with receiving the management frame.

6. The method of claim 2, further comprising:
    broadcasting, on the current wireless channel, a probe request frame that fails to elicit a probe response frame having an address field that matches a BSSID in the set of BSSIDs; and
    listening for management frames on one or more additional wireless channels in accordance with the probe request frame failing to elicit a probe response frame having an address field that matches a BSSID in the set of BSSIDs.

7. The method of claim 6, wherein the selective roaming to the new AP comprises:
    receiving a probe response frame from the new AP responsive to the probe request frame broadcast on the current wireless channel, the new AP being different than the one or more OBSSs; and
    roaming to the new AP in accordance with receiving the probe response frame.

8. The method of claim 6, wherein the selective roaming to the new AP comprises:
    receiving a management frame from the new AP on one of the one or more additional wireless channels; and
    roaming to the new AP in accordance with receiving the management frame.

9. An apparatus for wireless communications at a wireless station comprising:
    a system that includes one or more processors and one or more memories coupled with the one or more processors, the system configured to cause the apparatus to:
    detect, on a current wireless channel of the wireless station, wireless communications associated with one or more overlapping basic service sets (OBSSs) during an OBSS detection period;
    perform a signal quality measurement operation that indicates a quality of wireless communications with an associated access point (AP) on the current wireless channel, the signal quality measurement operation indicating, at a first time after the OBSS detection period, that the quality of wireless communications with the associated AP is below a threshold signal quality; and
    selectively roam, at the first time after the OBSS detection period, to a new AP that is associated with a first OBSS of the one or more OBSSs, wherein the selective roaming is associated with information indicating one or more characteristics of the wireless communications associated with each OBSS of the one or more OBSSs during the OBSS detection period or one or more supported capabilities associated with each OBSS of the one or more OBSSs during the OBSS detection period.

10. The apparatus of claim 9, wherein the system is further configured to cause the apparatus to:
store a set of BSS identifiers (BSSIDs) associated with the one or more OBSSs, each BSSID in the set of BSSIDs being identified in accordance with the detected wireless communications associated with a respective OBSS of the one or more OBSSs.

11. The apparatus of claim 10, wherein the system is further configured to cause the apparatus to:
store a respective candidate score associated with each BSSID in the set of BSSIDs, each of the candidate scores indicating a suitability of a respective OBSS of the one or more OBSSs as a roaming candidate for the wireless station.

12. The apparatus of claim 9, wherein the wireless communications are detected in accordance with one or more BSS color collisions.

13. The apparatus of claim 10, wherein the system is further configured to cause the apparatus to:
receive, from the new AP, a management frame having an address field that matches a BSSID in the set of BSSIDs; and
roam to the new AP in accordance with reception of the management frame.

14. The apparatus of claim 10, wherein the system is further configured to cause the apparatus to:
broadcast, on the current wireless channel, a probe request frame that fails to elicit a probe response frame having an address field that matches a BSSID in the set of BSSIDs; and
listen for management frames on one or more additional wireless channels in accordance with the probe request frame failing to elicit a probe response frame having an address field that matches a BSSID in the set of BSSIDs.

15. The apparatus of claim 14, wherein the system is further configured to cause the apparatus to:
receive a probe response frame from the new AP responsive to the probe request frame broadcast on the current wireless channel, the new AP being different than the one or more OBSSs; and
roam to the new AP in accordance with reception of the probe response frame.

16. The apparatus of claim 14, wherein the system is further configured to cause the apparatus to:
receive a management frame from the new AP on one of the one or more additional wireless channels; and
roam to the new AP in accordance with reception of the management frame.

17. An non-transitory computer-readable medium storing code for wireless communication at a wireless station, the code comprising instructions executable by one or more processors to cause the wireless station to:
detect, on a current wireless channel of the wireless station, wireless communications associated with one or more overlapping basic service sets (OBSSs) during an OBSS detection period;
perform a signal quality measurement operation that indicates a quality of wireless communications with an associated access point (AP) on the current wireless channel, the signal quality measurement operation indicating, at a first time after the OBSS detection period, that the quality of wireless communications with the associated AP is below a threshold signal quality; and
selectively roam, at the first time after the OBSS detection period, to a new AP that is associated with a first OBSS of the one or more OBSSs, wherein the selective roaming is associated with information indicating one or more characteristics of the wireless communications associated with each OBSS of the one or more OBSSs during the OBSS detection period or one or more supported capabilities associated with each OBSS of the one or more OBSSs during the OBSS detection period.

18. The non-transitory computer-readable medium of claim 17, wherein the instructions further executable by the one or more processors to cause the wireless station to:
store a set of BSS identifiers (BSSIDs) associated with the one or more OBSSs, each BSSID in the set of BSSIDs being identified in accordance with the detected wireless communications associated with a respective OBSS of the one or more OBSSs.

19. The non-transitory computer-readable medium of claim 18, wherein the instructions further executable by the one or more processors to cause the wireless station to:
store a respective candidate score associated with each BSSID in the set of BSSIDs, each of the candidate scores indicating a suitability of a respective OBSS of the one or more OBSSs as a roaming candidate for the wireless station.

20. The non-transitory computer-readable medium of claim 17, wherein the wireless communications are detected in accordance with one or more BSS color collisions.

* * * * *